(12) United States Patent
Constantine et al.

(10) Patent No.: US 12,455,953 B2
(45) Date of Patent: Oct. 28, 2025

(54) COMPUTER CHALLENGE SYSTEMS BASED ON OBJECT ALIGNMENT

(71) Applicant: ARKOSE LABS HOLDINGS, INC., San Mateo, CA (US)

(72) Inventors: Whitney Constantine, Brisbane (AU); Murry Lancashire, Brisbane (AU)

(73) Assignee: Arkose Labs Holdings, Inc., San Mateo, CA (US)

( * ) Notice: Subject to any disclaimer, the term of this patent is extended or adjusted under 35 U.S.C. 154(b) by 260 days.

(21) Appl. No.: 18/175,755

(22) Filed: Feb. 28, 2023

(65) Prior Publication Data

US 2023/0289427 A1    Sep. 14, 2023

Related U.S. Application Data

(60) Provisional application No. 63/317,693, filed on Mar. 8, 2022, provisional application No. 63/320,042, filed on Mar. 15, 2022.

(51) Int. Cl.
*G06F 21/36* (2013.01)
*H04L 9/40* (2022.01)

(52) U.S. Cl.
CPC .......... *G06F 21/36* (2013.01); *H04L 63/0853* (2013.01); *H04L 63/0884* (2013.01); *H04L 63/102* (2013.01); *G06F 2221/2133* (2013.01)

(58) Field of Classification Search
CPC ............. G06F 21/36; G06F 2221/2133; H04L 63/0853; H04L 63/0884; H04L 63/102

USPC .............................................. 726/6
See application file for complete search history.

(56) References Cited

U.S. PATENT DOCUMENTS

| | | | |
|---|---|---|---|
| 8,621,396 B1* | 12/2013 | Gossweiler, III | G06F 21/36 715/863 |
| 9,495,532 B1* | 11/2016 | Zhurkin | G06F 21/36 |
| 2010/0201478 A1* | 8/2010 | Veen | H04L 67/52 340/3.1 |
| 2012/0323700 A1* | 12/2012 | Aleksandrovich | G06F 21/36 705/14.69 |
| 2016/0019382 A1* | 1/2016 | Chan | G06F 3/0482 726/19 |
| 2019/0188371 A1* | 6/2019 | Shen | G06F 21/36 |
| 2020/0134159 A1* | 4/2020 | Ford | G06F 21/31 |

* cited by examiner

*Primary Examiner* — Jacob Lipman

(74) *Attorney, Agent, or Firm* — Womble Bond Dickinson (US) LLP

(57) ABSTRACT

A method of securing a computer resource against unauthorized access by a user computer system attempting to access the computer resource includes sending, by a processing device, a challenge data structure to the user computer system. The challenge data structure defines a challenge to be presented to a user of the user computer system. The challenge includes a user interface for manipulating one or more objects to match a defined alignment. The method further includes obtaining a user input to the user interface that represents a manipulation of the one or more objects to a first orientation and providing access to the computer resource for the user computer system based on whether the first orientation of the one or more objects matches the defined alignment.

20 Claims, 17 Drawing Sheets

COMPUTER CHALLENGE SYSTEMS BASED ON OBJECT ALIGNMENT

CROSS-REFERENCE TO RELATED APPLICATION

This application claims the benefit of U.S. Provisional Application No. 63/317,693, filed on Mar. 8, 2022, and U.S. Provisional Application No. 63/320,042, filed on Mar. 15, 2022, the entire contents of each of which are hereby incorporated by reference herein.

FIELD

The present disclosure generally relates to controlling access to computer resources to limit automated and unintended accessing of the computer resources. The disclosure relates more particularly to apparatus and techniques for presenting challenges to users that utilize images.

BACKGROUND

Computer resources are often created for access by humans and the creators may seek to reduce or block access to those computer resources when the access is by unintended users such as an automated process that is attempting access or by unintended human users who may be attempting to access the computer resources in ways unintended or undesired by their creators. For example, a web server serving web pages related to a topic may be set up for human users to browse a few pages but not set up for an automated process to attempt to browse and collect all available pages or for persons employed to scrape all of the data. As another example, a ticket seller may wish to sell tickets to an event online, while precluding unauthorized resellers from using an automated process to scrape data off the ticket seller's website and buy up large quantities of tickets.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
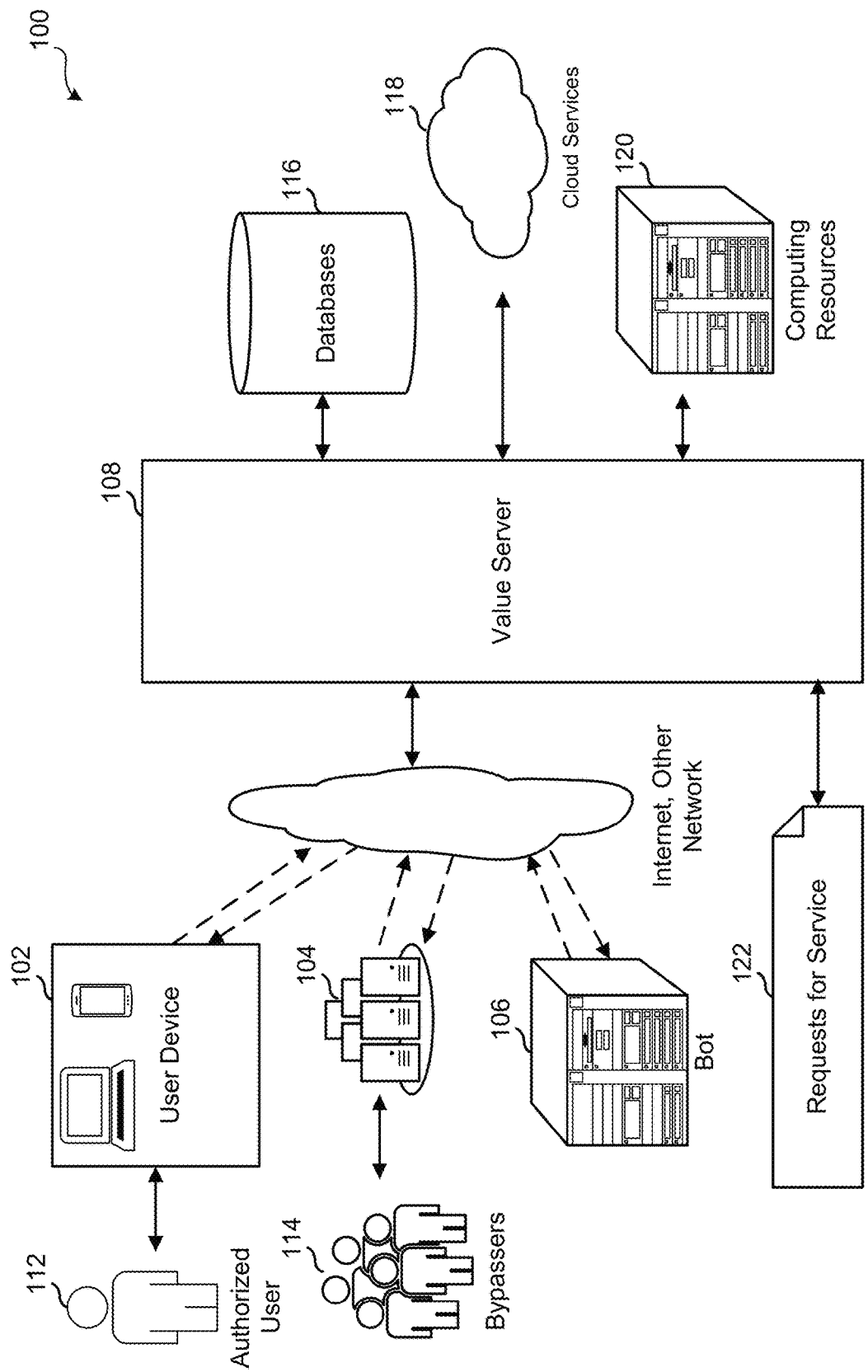
FIG. 1 is a block diagram of a network environment wherein an authentication challenge system may be deployed, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Unauthorized access and/or unwanted access to computer resources may be used to cause damage, such as highly-repetitive access to a computer resource in order to block others from accessing it, causing servers to crash, flooding comment sections with messages, creating a large number of fictitious identities in order to send spam or bypass limits, skewing results of a vote or poll, entering a contest many times, brute force guessing of passwords or decryption keys, or the like. In some cases, systems may perform user authentication, such as presenting authentication challenges in order to distinguish authorized users of a computing asset from unauthorized users. Unauthorized users may include unauthorized human users, users attempting to bypass controls ("bypassers"), and/or unauthorized automated agents.

A provider of computer resources may wish to determine whether a given user accessing those computer resources is a legitimate human user, an automated process, or a bypasser, given that access to the resources would be computer-mediated in each case. For example, companies and other organizations may create materials and make them available online, sometimes via intermediaries that charge per view. These organizations may spend huge sums, or make significant efforts, in creating and disseminating these materials, but wish to ensure that real, human consumers in their target audience view particular materials, as automated agents can generate false impressions that someone in the target audience has viewed the materials when in fact no real human in the target audience has done so. In some cases, there may be humans accessing that content, but not be in the target audience, such as someone deployed to access the content without viewing the materials. Companies and other organizations lose the effect of the money they pay by spending for these false impressions by unintended users, whether human or not.

Techniques described and suggested herein solve these and other problems by presenting computer authentication challenges and processing responses to computer authentication challenges. An authentication challenge may be issued and managed by an authentication program or system used to ensure that information entered into a computer, such as via a web site, is entered by a human user of a computing device rather than by an automated program commonly known as a bot or an agent. Agents are commonly used by computer hackers in order to gain illicit entry to web sites, or to cause malicious damage, for example by creating a large amount of data in order to cause a computer system to crash, by creating a large number of fictitious membership accounts in order to send spam, by skewing results of a vote or poll, by entering a contest many times, or by guessing a password or decryption key through a brute force method, etc. Thus, it can be desirable to detect such activities to block or limit them.

One example of such a user authentication program may present a string of arbitrary characters to a user and prompt the user to enter the presented characters. If the user enters the characters correctly, the user is allowed to proceed. Automated agents that have adapted to include character recognition may be able to circumvent such authentication programs. Authentication programs such as CAPTCHA ("Completely Automated Public Turing test to tell Computers and Humans Apart") programs have been developed to disguise text characters, for example by adding background noise, or randomly positioning the characters on the screen, rather than in pre-defined rows. Although such programs are successful at preventing some agents from accessing a computer, it also can be difficult for authorized human users to read such disguised characters. As such, character-based CAPTCHA authentication programs often can be frustrating and tedious to use.

Authentication programs may be able to be bypassed by somewhat sophisticated agents that can determine the requested answer despite the disguise. As such, character-based CAPTCHA authentication programs often fail to prevent automated abuse of the protected computer system.

Another example of a user authentication program may present a grid of photographs to a user and prompt the user to select one or more photographs that meet a stated criterion (e.g., "From the displayed pictures, select those that contain construction vehicles"). Although such programs can be successful at preventing some agents from accessing a computer, it also can be difficult for human users to decide whether the instruction applies or does not apply to photographs with ambiguous contents, such as whether a consumer-grade sports utility vehicle should be regarded as a construction vehicle. As a result, photo-based CAPTCHA authentication programs often can be frustrating and tedious to use for authorized users.

Such authentication programs may be able to be bypassed by somewhat sophisticated agents that can automatically recognize the contents of photographs and so such photo-based CAPTCHA authentication programs that rely solely on image recognition can fail to prevent automated abuse of the protected computer system.

An authentication system that can be bypassed by a merely somewhat sophisticated agent can motivate computer hackers to invest a small amount of labor to create such an agent, provided that the reward for bypassing the authentication system is greater than the investment that must be made to create the agent. On the other hand, an authentication system that can only be bypassed by a highly sophisticated agent may discourage computer hackers from investing the large amount of labor needed to create such an agent, as the reward for bypassing the authentication system may be smaller than the investment that must be made to create the agent.

Authentication system design therefore often takes into account these considerations, to provide a method and system for user authentication that is both easy for authorized users to pass without frustration and tedium and very difficult for unauthorized users, or at least create enough of a cost for unauthorized users to discourage investment of labor into creating a work-around.

In an example hardware system according to some embodiments of the present disclosure, an authentication challenge system may be coupled with a value server that serves or manages some protected computer resource that can be accessed by user devices and is to be protected by the authentication challenge system against unauthorized user device access while permitting authorized user devices to access the value server, to some level of protection. The level of protection may not be absolute in that some authorized user devices may be blocked from access and some unauthorized user devices may obtain access.

FIG. 1 is a block diagram of a network environment 100 wherein an authentication challenge system may be deployed, according to an embodiment. In the example shown in FIG. 1, a user device 102, a set of bypasser devices 104, and a bot 106 may be attempting to obtain services from a value server 108. It is assumed in this example that a user 112 operating user device 102 is an authorized user to whom an operator of value server 108 is willing to provide services, whereas the operator is not willing to provide services to bypassers 114 using the set of bypasser devices 104 or to bot 106. The particular services provided are not necessarily relevant to processes of trying to allow authorized access and trying to prevent unauthorized access, but examples are illustrated, including databases 116, cloud services 118, and computing resources 120. Those services may include serving webpages and interactions with users. Various devices may send requests 122 for services and receive in response the requested services, receive a challenge (possibly followed by the requested services if the challenge is met), or receive a rejection message. As explained herein, the challenge could be a process that is designed to filter out requesters based on an ability to meet a challenge, where meeting the challenge requires some real-world experience and/or knowledge not easily emulated by a computer—thus potentially blocking bot 106 from accessing services—and that is potentially time-consuming for bypassers 114 to work on—thus potentially making the requests economically infeasible for a hired set of bypassers 114 or other bypassers 114 who may not be interested in the requested services as much as bypassing controls for others or for various reasons, all while limiting a burden on an authorized legitimate user (e.g., authorized user 112) of the services.

Figure 2:
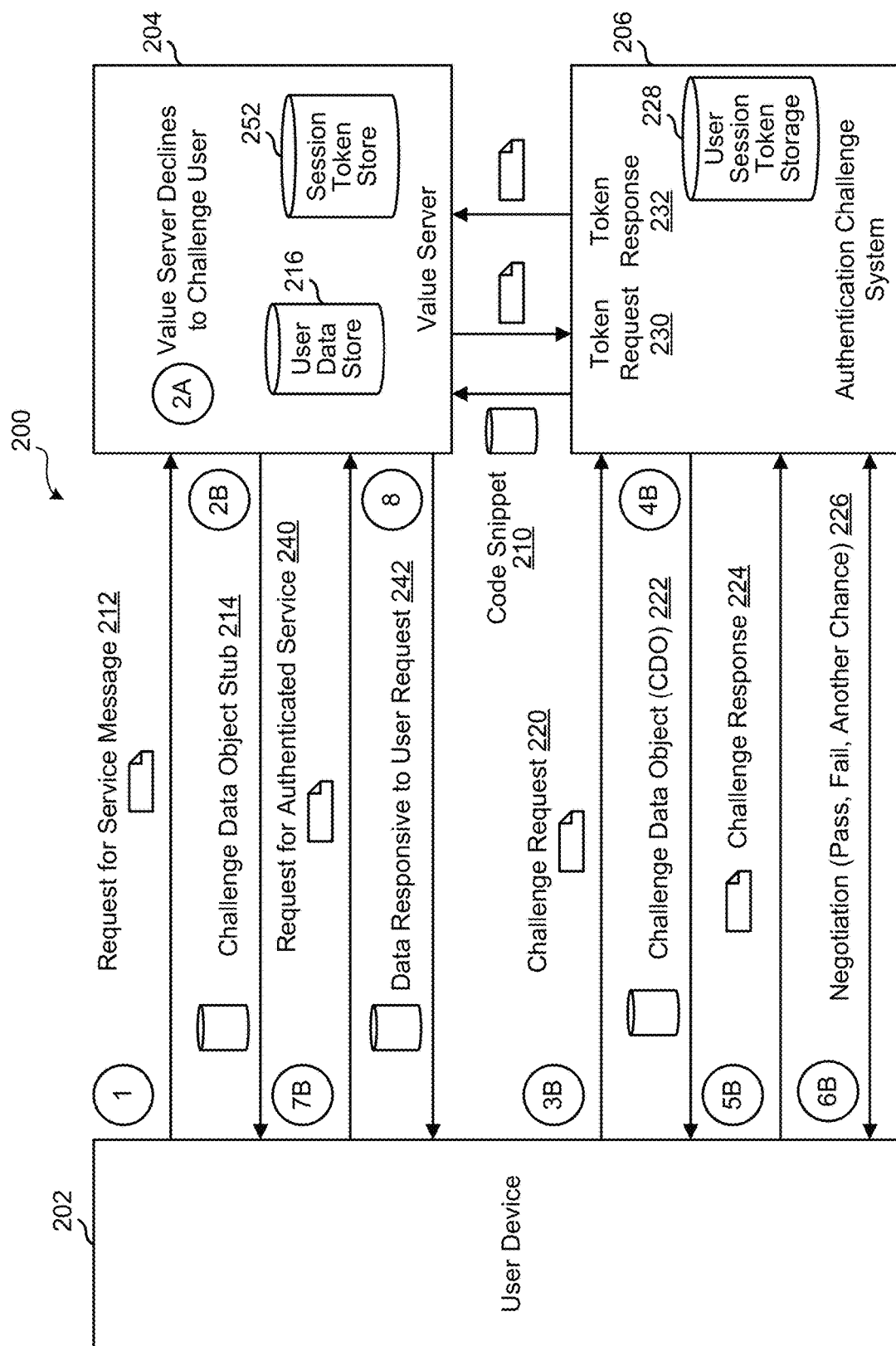
FIG. 2 is a block diagram of an authentication challenge system and exemplary components, according to an embodiment of the present disclosure.

FIG. 2 is a block diagram of an authentication challenge system 200 and example components, according to an embodiment. Messages and data objects that are passed among components are shown in greater detail than in FIG. 1, but user device 202 in FIG. 2 may correspond to user device 102 in FIG. 1, a bypasser device 104 of FIG. 1, or bot 106 of FIG. 1, while value server 204 may correspond to value server 108 of FIG. 1. That said, those like components may be different or differently configured.

Also illustrated in FIG. 2 are indicators of a typical order of operations of communications among user device 202, value server 204, and an authentication challenge system 206. It should be noted that other orders of operations may be taken, and some operations may be omitted or added. In a precursor operation, authentication challenge system 206 may supply value server 204 a code snippet 210 usable by value server 204 for handling challenges.

In an operational process illustrated, user device 202 may send a "request for service" message 212 to value server 204 (referenced as communication "1"). Value server 204 may then determine whether a challenge is to be provided and either declines to challenge the user device 202 making the request (communication 2A) or to challenge the user device 202 making the request. For example, where user device 202 is already logged in and authenticated to value server 204, value server 204 may have enough information to be able to skip a challenge process and may respond to the user request immediately without requiring further authentication.

In the case where value server 204 decides to challenge, value server 204 may send (communication 2B) a challenge data object (CDO) stub 214 to user device 202. CDO stub 214 may have been supplied as part of code snippet 210 from the authentication challenge system 206. In some embodiments, what is sent is an entire CDO as explained herein elsewhere. In some embodiments, as explained herein elsewhere, CDO stub 214 may include information about the user or the request and such information may be encrypted or signed such that user device 202 cannot easily alter the information without that alteration being detected. Such information may include details about the user that are known to value server 204, such as an IP address associated with the request, country of origin of the request, past history of the user, if known, etc. This data may be stored as user data in user data store 216.

CDO stub 214 may be code, a web page, or some combination that is designed to have user device 202 issue a challenge request 220 (communication 3B). For example, CDO stub 214 may be code that generates and transmits challenge request 220, or it may be a web page that is displayed by user device 202, perhaps with a message like "Click on this line to get validated before you can access the requested resource" with the link directed to authentication challenge system 206. In response to receiving challenge request 220, authentication challenge system 206 may respond (communication 4B) with a challenge data object (CDO) 222, example structures of which are detailed herein elsewhere.

CDO 222 may include code, a web page, or some combination that can be processed by user device 202 to present a challenge to a user of user device 202. Authentication challenge system 206 may then await a response from user device 202, typically while handling other activities asynchronously. User device 202 may send a challenge response 224 (communication 5B) to authentication challenge system 206. The challenge response 224 may be a result of input provided by the user of the user device 202. For example, the challenge response 224 may be generated in response to interaction of one or more input devices (e.g., a keyboard, mouse, touch screen, speaker, etc.) of the user device 202. As explained elsewhere herein, authentication challenge system 206 can process challenge response 224 in light of CDO 222 and evaluate whether the user satisfied the challenge represented in CDO 222 and then engage in a negotiation 226 (explained in more detail below) with user device 202 (communication 6B).

If authentication challenge system 206 determines that the challenge was met, communication 6B (negotiation 226) can be in the form of a "pass" message, while if authentication challenge system 206 determines that the challenge was not met, communication 6B can be in the form of a "fail" message. Another alternative is a message indicating that the user has additional chances to try again, perhaps with a new challenge included with such alternative message (e.g., "Your answer did not seem right, given the challenge. Click here to try again.").

Challenge response 224 and/or challenge request 220 may include information from value server 204 that passed through user device 202, perhaps in a secured form. That information may allow authentication challenge system 206 to identify the user and a user session for which the challenge is to apply. Authentication challenge system 206 may then store a user session token in user session token storage 228 indicating the results of the challenge. Then, when value server 204 sends a token request 230 identifying the user and user session, authentication challenge system 206 can reply with a token response 232 indicating whether the user met the challenge, and possibly also that the user did not meet the challenge or that the user never requested a challenge or responded to one.

The CDO stub 214 may be such that the user device 202 may send a request for authenticated service to value server 204, such as a webpage portion that instructs "Once you are authenticated, click here to proceed to your desired content" or the like in the form of a request for authenticated service 240 (communication 7B), which can signal to value server 204 that the user is asserting that they have completed the challenge. Of course, value server 204 need not trust the assertion, but may then be aware that authentication challenge system 206 may indicate that the challenge was indeed correctly responded to. Request for authenticated service 240 may be sent by user device 202 without user interaction after user device 202 receives a success message related to negotiation 226.

At this point, value server 204 can send token request 230 to authentication challenge system 206 and receive token response 232 from authentication challenge system 206. In some embodiments, value server 204 may wait a predetermined time period and send token request 230 without waiting for a signal from user device 202. In such embodiments, user device 202 may not send a request for authenticated service after its initial request. In some embodiments, authentication challenge system 206 may delay sending token response 232 if authentication challenge system 206 is involved in processing a challenge with user device 202 such as when the user has not yet requested a challenge or has failed a challenge but is given another chance, so that authentication challenge system 206 can ultimately send a token response indicating a successful response to the challenge.

In any case, value server 204 may respond with data 242 responsive to the user request (communication 8). If authentication challenge system 206 can independently determine that user device 202 is operated by an authorized user, then authentication challenge system 206 may store a user session token in user session token storage 228 indicating that a challenge was met. In that case, the timing of receiving token request 230 may be less important, as authentication challenge system 206 would be ready to respond at any time.

A number of examples of challenges are described in detail herein, including possible user responses that could be conveyed in challenge response messages. While just one challenge process was described in detail, it should be understood that value server 204 may process many requests in parallel and interact with more than one authentication challenge system and authentication challenge system 206 may process requests from many user devices in parallel and interact with many value servers.

Challenge response message 224 may include, in addition to an indication of the user's response to the challenge, a challenge identifier that identifies CDO 222 that was sent to challenge the user, in which case authentication challenge system 206 can easily match up the response with the challenge to determine if the response is consistent with an answer key for the specific challenge given.

Once value server 204 receives token response 232 and token response 232 indicates that the user is authenticated and not an undesired user, value server 204 can determine its next operation. Value server 204 may also store token response 232 into a session token store 252 usable for handling subsequent requests from the user. At this point in the process, whether value server 204 determined that no challenge was to be provided (communication 2A) or determined a challenge was to be provided and has a token response indicating that the challenge was met, value server 204 can respond to the request of the user device 202.

In some embodiments of the process, the processing may be done in a time period similar to a time period normally required for processing service requests. In other words, it could appear to the user that the processing is quick, except for the time the user takes to mentally process and respond to the challenge presented. As explained herein below, CDOs may be created in advance for quick deployment.

In the example shown in FIG. 2, a value server is configured to handle some of the authentication processes. Another variation could be used where the value server does not handle any authentication and may not even be aware it is happening. This may be useful for securing legacy systems.

Figure 3:
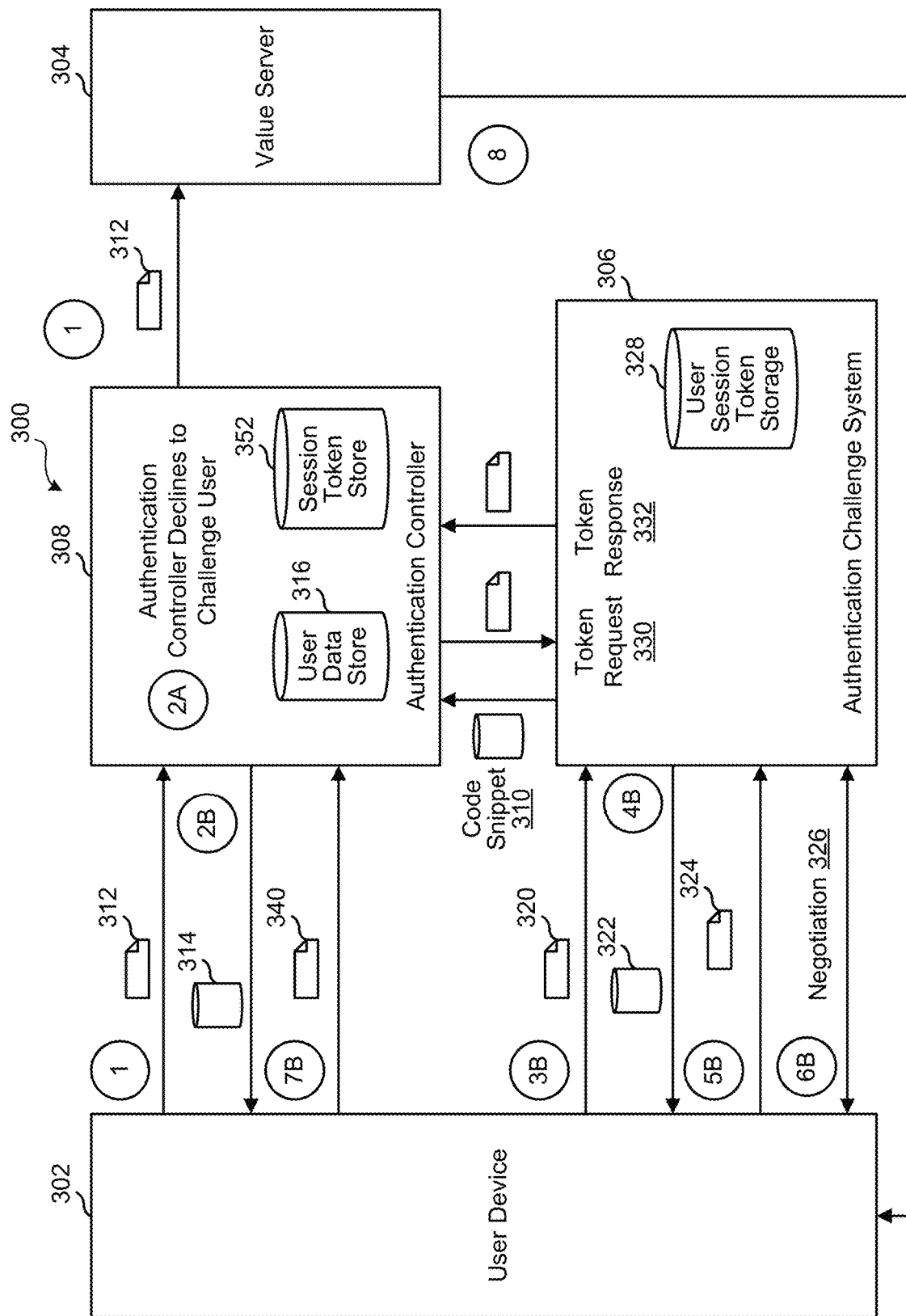
FIG. 3 is a block diagram of a system in which a value server is secured using an authentication controller for access control, in accordance with some embodiments of the present disclosure.

FIG. 3 is a block diagram of a system 300 in which a value server 304 is secured using an authentication controller for access control such that requests from a user device 302 can be limited, mostly, to requests from authorized users. As shown there, an authentication challenge system 306 and an authentication controller 308 together operate to control access of user device 302 to value server 304. As illustrated, a communication 1 comprises a request for services 312 from user device 302 to authentication controller 308 and may be a request similar to other requests described herein.

Also illustrated in FIG. 3 are indicators of a typical order of operations of communications among user device 302, value server 304, authentication challenge system 306, and authentication controller 308. It should be noted that other orders of operations may be taken, and some operations may be omitted or added. In a precursor operation, authentication challenge system 306 may supply authentication controller 308 a code snippet 310 usable by authentication controller 308 for handling challenges. In some embodiments, authentication challenge system 306 and authentication controller 308 are integrated.

In an operational process illustrated, user device 302 sends a "request for service" message 312 towards value server 304 (communication 1), which is either intercepted by authentication controller 308 or passed through to value server 304. As with value server 204 of FIG. 2, authentication controller 308 determines whether a challenge is to be provided and either declines to challenge the user device 302 making the request (communication 2A) or to challenge the user device 302 making the request, possibly relying on user data in a user data store 316.

In the case where authentication controller 308 decides to challenge, authentication controller 308 sends a challenge data object (CDO) stub 314 to user device 302 (communication 2B). CDO stub 314 may be code, a web page, or some combination that is designed to have user device 302 issue a challenge request 320 (communication 3B) to authentication challenge system 306, similar to CDO stub 214 shown in FIG. 2. In response to receiving challenge request 320, authentication challenge system 306 may respond (communication 4B) with a challenge data object (CDO) 322, similar to CDO 222 of FIG. 2. Authentication challenge system 306 may then await a response from user device 302, typically while handling other activities asynchronously. User device 302 may send a challenge response 324 (communication 5B) to authentication challenge system 306. The challenge response 324 may be a result of input provided by the user of the user device 302. For example, the challenge response 324 may be generated in response to interaction of one or more input devices (e.g., a keyboard, mouse, touch screen, speaker, etc.) of the user device 302. Authentication challenge system 306 can process challenge response 324 in light of CDO 322 and evaluate whether the user satisfied the challenge represented in CDO 322 and then engage in a negotiation 326 with user device 302 (communication 6B).

If authentication challenge system 306 determines that the challenge was met, communication 6B (negotiation 326) can be in the form of a "pass" message, while if authentication challenge system 306 determines that the challenge was not met, communication 6B can be in the form of a "fail" message. Another alternative is a message indicating that the user has additional chances to try again, perhaps with a new challenge included with such alternative message.

Challenge response 324 and/or challenge request 320 may include information from authentication controller 308 that passed through user device 302, perhaps in a secured form. That information may allow authentication challenge system 306 to identify the user and a user session for which the challenge is to apply. Authentication challenge system 306 may then store a user session token in user session token storage 328 indicating the results of the challenge. Then, when authentication controller 308 sends a token request 330 identifying the user and user session, authentication challenge system 306 can reply with a token response 332 indicating whether the user met the challenge, and possibly also that the user did not meet the challenge or that the user never requested a challenge or responded to one. Authentication challenge system 306 and/or authentication controller 308 may have logic to delay token request 330 and/or token response 332 to give the user time to complete a challenge but can send token request 330 after receiving a request for authenticated service 340 (communication 7B). For example, authentication challenge system 306 may wait ten seconds after receiving token request 330 before responding with token response 332 if the user has not yet requested a challenge or has failed a challenge but is given another chance. Authentication controller 308 may have logic to delay sending token request 330 to give the user some time to complete a challenge process with authentication challenge system 306.

If authentication challenge system 306 can independently determine that user device 302 is operated by an authorized user, then authentication challenge system 306 may store a user session token in user session token storage 328 indicating that a challenge was met. While just one challenge process was described in detail, it should be understood that authentication controller 308 may process many requests in parallel and interact with more than one authentication challenge system and more than one value server and authentication challenge system 306 may process requests from many user devices in parallel and interact with many authentication controllers.

Challenge response 324 may include, in addition to an indication of the user's response to the challenge, a challenge identifier that identifies CDO 322 that was sent to challenge the user, in which case authentication challenge system 306 can easily match up the response with the challenge to determine if the response is consistent with an answer key for the specific challenge given.

Once authentication controller 308 receives token response 332 and token response 332 indicates that the user is authenticated and not an undesired access, authentication controller 308 can determine its next operation. Authentication controller 308 may also store token response 332 into a session token store 352 usable for handling subsequent requests from the user. At this point in the process, whether authentication controller 308 determined that no challenge was to be provided (2A) or determined a challenge was to be provided and has a token response indicating that the challenge was met, authentication controller 308 can forward the user's request to value server 304, which may respond (communication 8) to user device 302 as if no authentication took place.

As with embodiments where a value server handles some of the tasks, all of the processing may be done in a time period similar to a time period normally required for processing service requests and CDOs may be created in advance for quick deployment. In some of these operations and examples, the communication and/or message or data sent corresponds to what is depicted in FIG. 3 and described herein.

An authentication challenge system may have multiple components, such as a decision server that decides whether a user device should be challenged, a response processor that evaluates user responses to challenges, a challenge server that outputs and manages challenges, a challenge creation system usable for creating challenges and classes of challenges, and an authentication access system that controls whether the user device obtains access to the value server. Some of these components may be integrated into a single system, such as where the challenge processor and decision server are integrated, the challenge processor and response processor are integrated, or all three are integrated.

Figure 4:
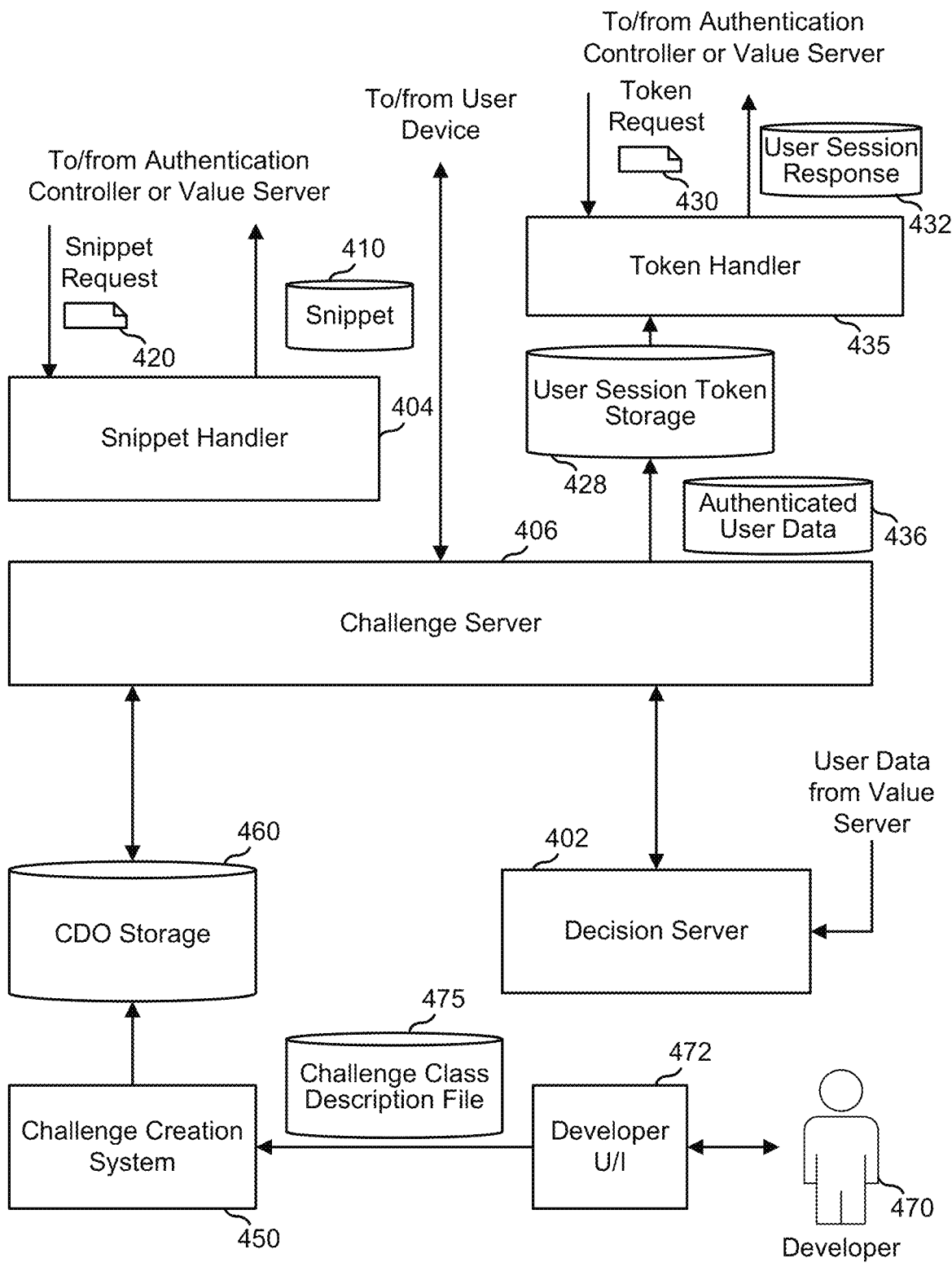
FIG. 4 is a block diagram of an authentication challenge system in an embodiment of the present disclosure.

FIG. 4 is a block diagram of an authentication challenge system in an embodiment. As illustrated there, an authentication challenge system may include a snippet handler 404 that receives a snippet request 420 from a value server or an authentication controller and responds with a code snippet 410, such as code snippets 210 and 310 (in FIGS. 2-3). A challenge server 406 may receive and respond to messages from a user device (as detailed in FIG. 5). A token handler 435 may receive token requests 430 from a value server or an authentication controller and respond with a token response 432, such as token requests 230, 330 and token responses 232, 332 in FIGS. 2-3, in response to data read from a user session token storage 428. The challenge server 406 may provide user session data 436 for the user session token storage 428.

As shown, the challenge server 406 may interact with a decision server 402 that decides whether to challenge a user, perhaps based in part on user data received from a value server or an authentication controller. The challenge server 406 may interact with a CDO storage 460 to retrieve CDOs to provide to user devices. The CDO storage 460 may be pre-populated with CDOs for quick response. Those CDOs may be created in advance by a challenge creation system 450. A developer 470 may develop classes of challenges using a developer user interface 472 to create challenge class description files 475 that the challenge creation system 450 can use to generate large numbers of distinct CDOs. By being able to create large numbers of distinct CDOs from one challenge class description file 475, the labor effort per CDO can be reduced, allowing for many more distinct challenges (which may be more work for bypassers to try and work around) without requiring much more work on the part of developers 470.

Figure 5:
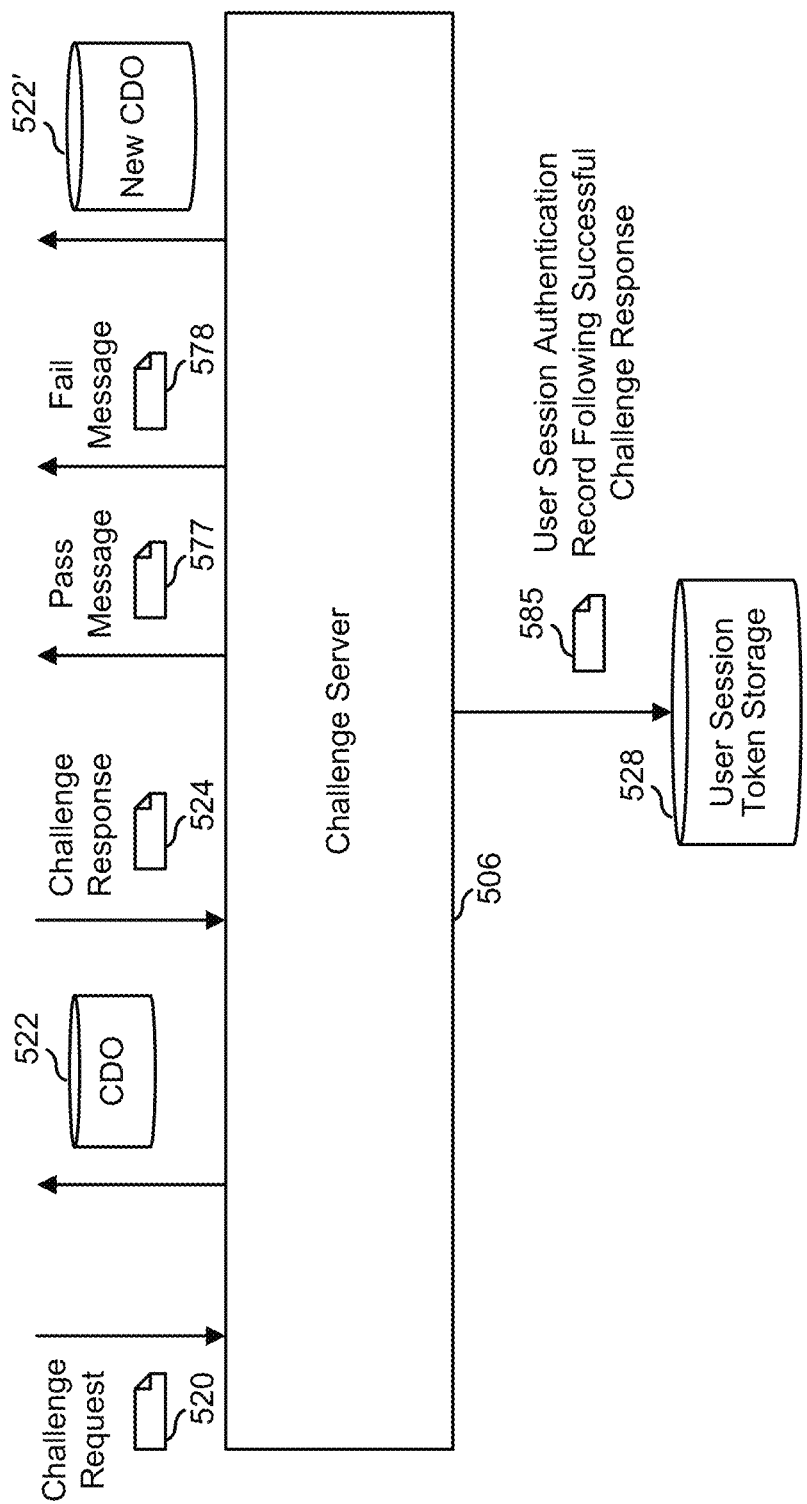
FIG. 5 is a block diagram showing user interactions with the challenge server, in an embodiment of the present disclosure.

FIG. 5 is a block diagram showing user interactions with the challenge server 506, in an embodiment. The challenge server 506 may be similar to that of the challenge server 406 of FIG. 4. As shown in FIG. 5, a user device (e.g., user device 202 or 302 of FIGS. 2 and 3) may send a challenge request 520 to the challenge server 506, which may respond with a CDO 522. The user device may send a challenge response 524, perhaps formatted so that the challenge server 506 can determine the corresponding CDO 522 or at least whether the challenge response 524 is a valid response. The challenge server 506 may then send the user device a "pass" message 577, a "fail" message 578, or a new CDO 522' giving the user a chance to respond to a new challenge. Where the user device provides a valid and correct challenge response 524, the challenge server 506 may then store a user session authentication record 585 into a user session token storage 528.

Figure 6:
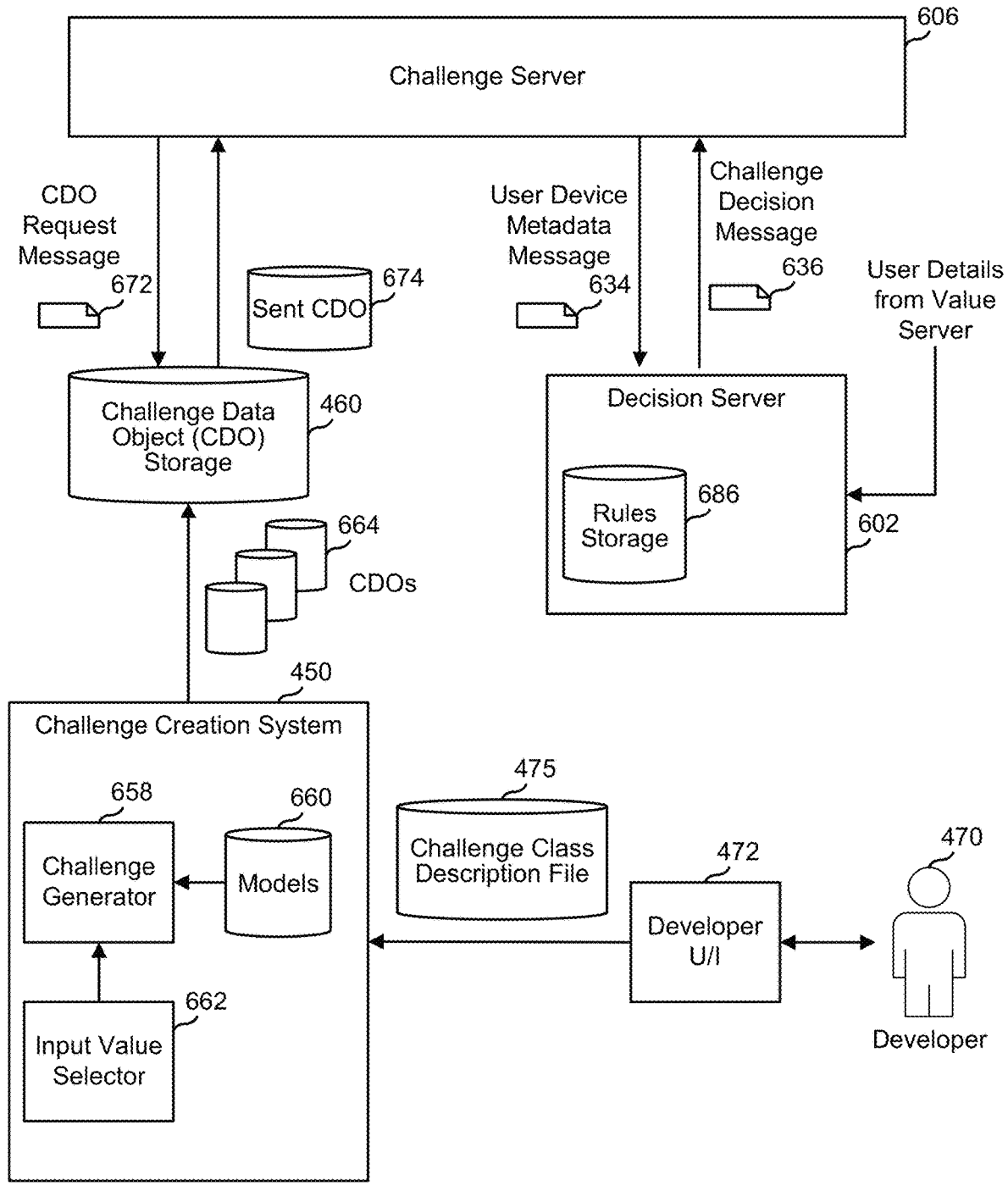
FIG. 6 illustrates internal operations of an authentication challenge system in greater detail, in an embodiment of the present disclosure, considering FIGS. 4-5 in context.

FIG. 6 illustrates internal operations of an authentication challenge system in greater detail, in an embodiment, considering FIGS. 4-5 in context. As shown there, a developer 470 may use a developer user interface 472 to generate a challenge class description file 475 and provide that to a challenge creation system 450, which may comprise a challenge generator 658 that receives input value selections from an input value selector 662 and models from a model store 660. With this approach, challenge creation system 450 can generate a large number of CDOs 664 from challenge class description file 475 and those can be stored into a CDO storage 460.

A challenge server 606 may send a CDO request message 672 to CDO storage 460, perhaps in response to a user's challenge request. CDO storage 460 may reply to challenge server 606 with a CDO 674. Challenge server 606 may send a user device metadata message 634 to a decision server 602 and get back a challenge decision message 636 indicating whether a user should be challenged. A decision by decision server 602 may be based on rules stored in a rules storage 686, which may be rules as described herein elsewhere, and/or based on user data from a value server and/or an authentication controller.

Attempts to access the protected computer resource may be made by various users. Typically, the operator of the computer resource may want to allow legitimate users to access the computer resource, while blocking bypassers (users who may be attempting to access the computer resource in ways undesired or unintended by the operator, such as being employed to bypass legitimate controls, and/or masquerade as genuinely interested customers) and automated users, such as bots (automated processes that may be attempting to access the computer resource in ways undesired or unintended by the operator). In such cases, the operator may set up the computer resource on a value server and have access to that value server controlled by an authentication access system of an authentication challenge system.

An authentication access system may serve as a gatekeeper to a computer resource protected by the authentication challenge system and/or may provide a recommendation or result to another system that controls the computer resource. Thus, the authentication access system may block what is determined to be an access by an unintended user and allow what is determined to be an access by a legitimate user or may just provide messaging to other systems that may result in such access controls.

Protection of computer resources may comprise giving legitimate users easy access the computer resource while blocking unintended users (e.g., bypassers and bots) or at least making access more difficult for unintended users. The computer resource may be a server providing content (e.g., a web server serving web pages), an e-commerce server, an advertising-supported resource, a polling server, an authentication server, or other computer resource. The computer resource may be data, communications channels, computing processor time, etc. In part, a role of the authentication challenge system is to try and determine what kind of user is attempting an access and selectively put up roadblocks or impediments for unintended users.

A value server may provide computer resources, or access thereto, to a user having a user device. The user device may be a computer device the user uses to connect to the value server. The value server can issue to the user device a demand for the user to successfully complete a challenge before the value server issues to the user the service of value. In some embodiments, the value server sends the user device a message indicating that the user device should contact an authentication challenge system, obtain an access token (which the authentication challenge system would presumably only supply if it deemed the user successful in a challenge), and provide the access token to the value server in order to access desired assets.

The nature of the user device may not be apparent to the value server or other components of the authentication challenge system, but those components may be configured as if the user device is a user device that can be operated by an automated process or by a human process. For example, responses to challenges may be received that could have been generated by an automated process or by a human.

A decision server determines whether a user system is to be challenged and, if so, what class, level, and/or type of challenge to use. The decision server may respond to a request from a value server or a request from a user system, perhaps where the user system is sending the request to the decision server at the prompting of the value server. The value server may send the decision server a set of user properties that may be known to the value server but not necessarily knowable by the decision server. Examples may include a user's history of activity with the value server, transactions the user made on the value server, etc. For example, the value server may indicate to the the decision server that certain users are suspicious based on past interactions with the value server and the decision server may use this information to lean towards issuing a challenge, whereas in the value server indicates that a user has behaved normally in the past and is a regular, known user, the decision server may use this information to lean away from issuing a challenge. The decision server can evaluate the user details that the value server provides, along with its own information, and compute a decision. The decision server may also have access to other data about the user or user's device, such as past history from other sources, user properties, a device fingerprint of the user's device, etc. The decision server may determine that the user's device had attempted to automatically solve previous challenges, and therefore decide to issue a challenge that is especially hard to automate. The decision server may decide that no challenge is necessary, that some challenge is necessary, and if necessary, what class, level, and/or type of challenge is warranted. The decision server may store the user properties and details of a present decision, which can be used for making future challenge decisions.

In some embodiments, instead of the value server passing data about the user directly to the decision server, the value server may pass the data via the user device, perhaps in an encrypted form, with the user device forwarding that data to the decision server. If the decision server can decrypt it, but the user device cannot, that allows for secure transmission of that data from the value server to the decision server. Presumably, that would make it difficult for the user device to create a false set of data. In some embodiments where the data passes through the user device, the user device may be directed to pass data back to the decision server if the user device is to obtain access to the value server. In some embodiments, the value server and the decision server may communicate directly. There are various ways the decision server could be alerted to some bypass attempts, in which case the decision server may determine that it is to issue a new challenge, perhaps under the suspicion that the user device has tampered with the data.

The decision server can send a decision message indicating the decision and details to the value server and/or the user device. In the latter case, the decision message may include an identifier that the user device can pass on to the value server. In an embodiment, a value server instructs the user device to make a request to the decision server, the user device makes the request of the decision server, the decision server decides not to issue a challenge and provides the user device with a token that the value server will accept for providing access to the controlled asset, or the decision server decides to issue a challenge and after the user device successfully meets the challenge, a component of the authentication challenge system (the decision server or other component) provides the user device with the token that the value server will accept for providing access to the controlled asset.

A response processor receives challenge details of a challenge and a user response to a challenge and determines whether the challenge is met. In some embodiments, the challenge is deemed met if the user device provides an answer to a challenge query that matches a pre-stored answer to that challenge. The response processor may receive a challenge evaluation data object from another component, where the challenge evaluation data object may include details of the challenge and the user response and reply with a binary answer to whether the response is deemed correct. The reply of the response processor may be to the decision server, which can then store information for future challenges, may be to the user device with a token that the value server would accept, or other options that convey results of a user response evaluation. In some instances, the response processor may provide a reply that is inconsistent with what actually occurred, such as deeming that an automated process is actually a human or that a human authorized user is actually an unauthorized user. However, with a well-designed response processor and other components, such incidents may be infrequent. In some instances, the response processor may initially deem a response to be correct enough to allow for access but may indicate that the user is questionable and that may trigger the decision server to issue additional challenges. This may be useful in the case where a human repetitively attempting access can get the response correct, but still be judged as undesired, and therefore get flagged for more challenges that spend more time in order to render those activities less profitable. In some cases, the response may be correct, but have indicia of automation, such as a response being so quick that it may be from an automated source. In this manner, the decision server can take various factors into account to determine whether to issue a challenge, while the response processor simply outputs a binary decision to allow access or block access. In other variations, the response processor can output a decision that has more than two possibilities. In a specific example, the response processor has three possible responses to a received challenge evaluation data object: "allow the user access to the value server," "deny the user access to the value server," and "issue another challenge."

A challenge server may output and manage challenges, perhaps in the form of challenge data objects. The challenge server may send a challenge data object to a decision server and/or to a user device directly. A challenge data object may have elements that are known to the authentication challenge system but are not conveyed to the user device, such as details used to construct the challenge represented in the challenge data object that may be stored as a set of pre-determined human expectations generated based on a model used to construct the challenge.

A challenge processor, perhaps part of the decision server and/or the response processor, can evaluate details, metadata, etc. of a user response, and assess future risks of interactions with that user, which can then be forwarded to the decision server to help with future decisions about whether to challenge the user.

An authentication access system may be used to control access to the value server, such as in cases where the value server is not configured to request and evaluate tokens from users or user interactions. In such cases, the authentication access system can handle those tasks and interact with the decision server, the response processor, and/or the challenge processor. In a specific implementation, user devices and user computer systems of those user devices can only access the value server via the authentication access system and the value server allows for access from any system that the authentication access system allows through. The authentication access system can then be the gatekeeper of the value server.

Figure 7:
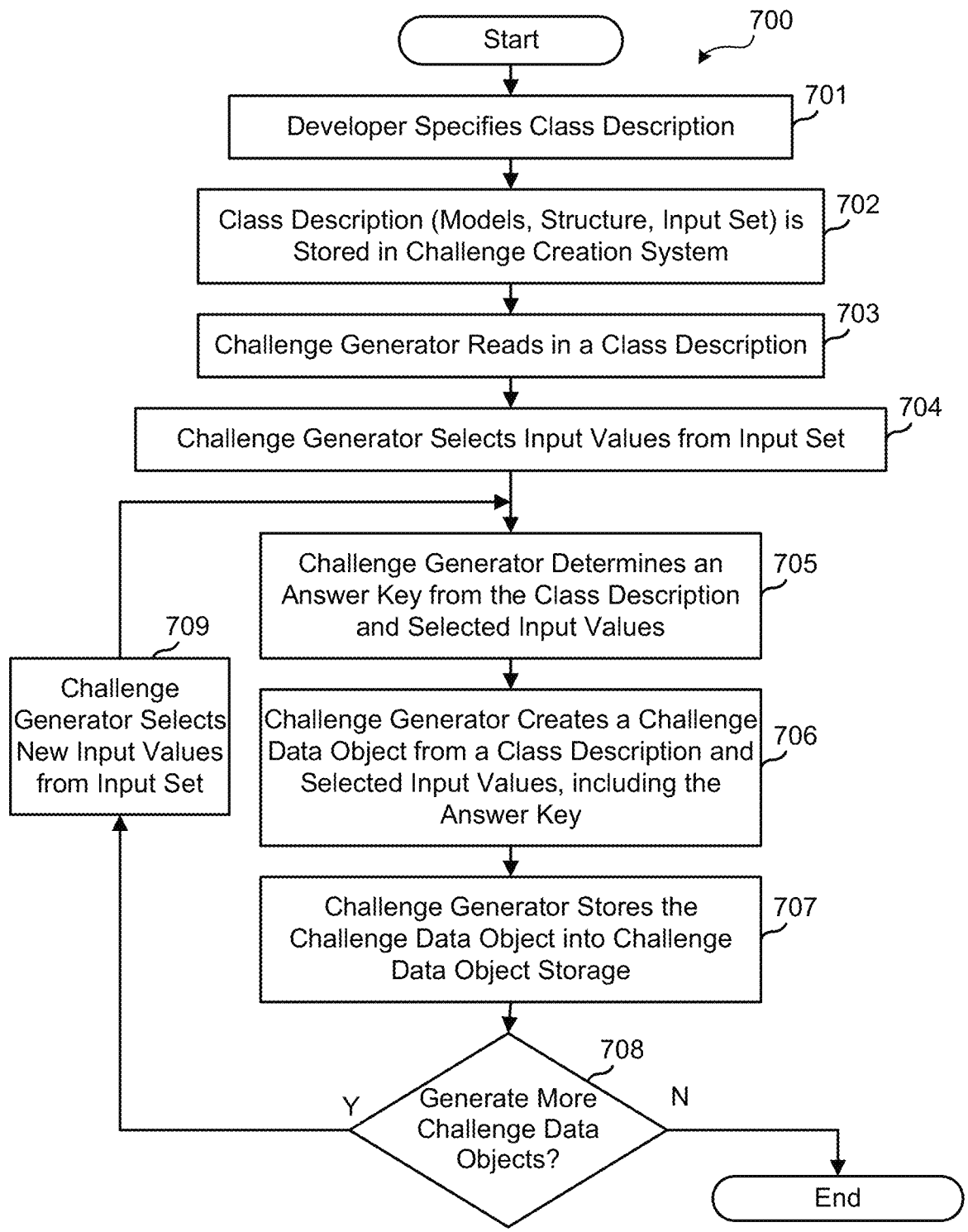
FIG. 7 is a flowchart depicting a method for creation of a class of authentication challenges, according to an embodiment of the present disclosure.

FIG. 7 is a flow diagram of a method 700 for creating a class of authentication challenges, in accordance with one or more aspects of the disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by a computing device (e.g., the challenge creation system 450 of at least FIGS. 4 and 6).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring to FIG. 7, in method 700, at operation 701, a developer may specify a class description. At operation 702, a class description (models, structure, input set) is stored in a challenge creation system. At operation 703, a challenge generator reads in a class description, and at operation 704, the challenge generator selects input values from an input set. At operation 705, the challenge generator determines an answer key from the class description and the selected input values. At operation 706, the challenge generator creates a challenge data object from the class description and selected input values, including the answer key. At operation 707, the challenge generator stores the challenge data object into a challenge data object storage. At operation 708, the challenge generator determines whether to generate more CDOs. If so, at operation 709, the challenge generator selects new input values from an input set and loops back to operation 705. If not, the process terminates or proceeds to another class description.

In a particular embodiment, models correspond to tiles, and images that form part of presentations are concatenations of tiles. In some embodiments, the boundaries of the tiles are clear (e.g., ten distinct images are illustrated) but in other challenges, the images corresponding to different answer options are not presented as clearly delineated tiles to the user devices, but may be a singular scene built of multiple objects where the boundaries are known only to the authentication server. Thus, in some embodiments, the CDO data that the user device receives may not have a clear indication of boundaries and that may be left to the user to discern, as needed, making automated processing harder.

An authentication challenge, according to an embodiment, may proceed as described herein using the generated CDOs. A challenge may involve a user interacting with a two-dimensional (2D) object, a three-dimensional (3D) virtual object, and/or a 2D rendering of a 3D virtual object to align the virtual object along a particular alignment direction, such as by rotating and/or shifting the virtual object along one or more axes of rotation. Various scenarios are described further below. It will be appreciated that these scenarios are merely examples, and the embodiments of the present disclosure are not limited to such examples. Many different types of examples are possible without deviating from the scope of the present disclosure.

Figure 8A:
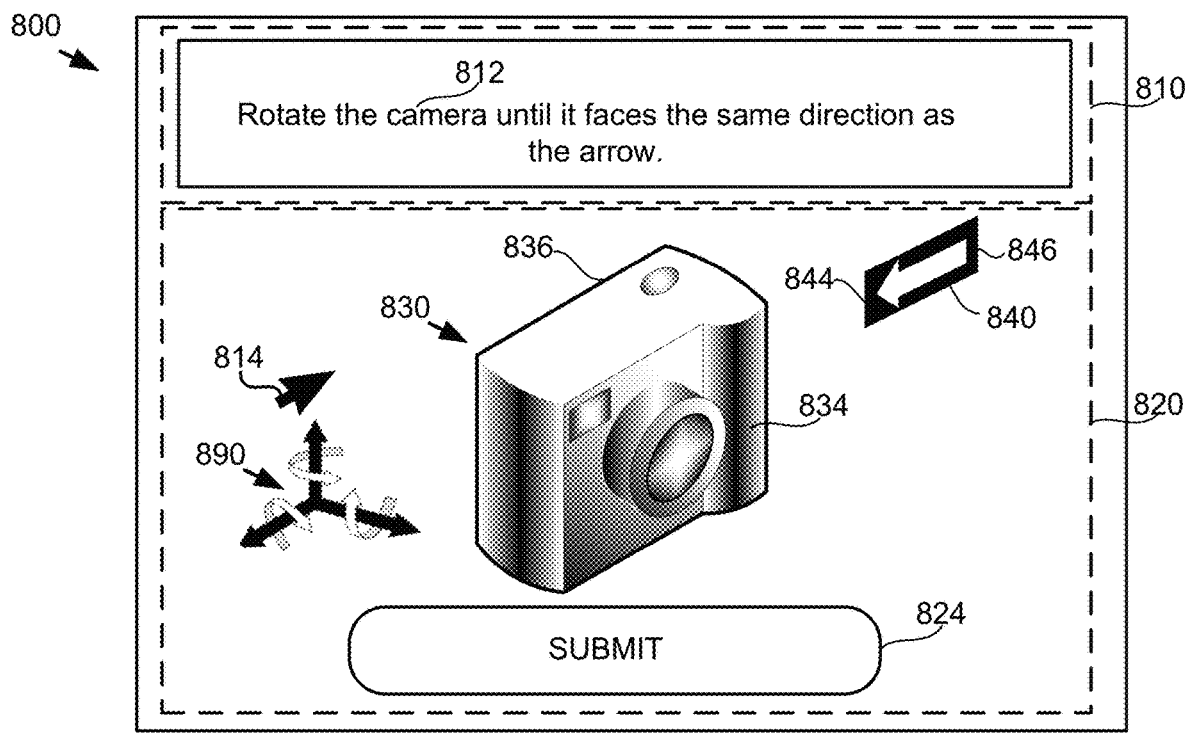
FIG. 8A illustrates an example of a challenge user interface according to some embodiments of the present disclosure.
Figure 8B:
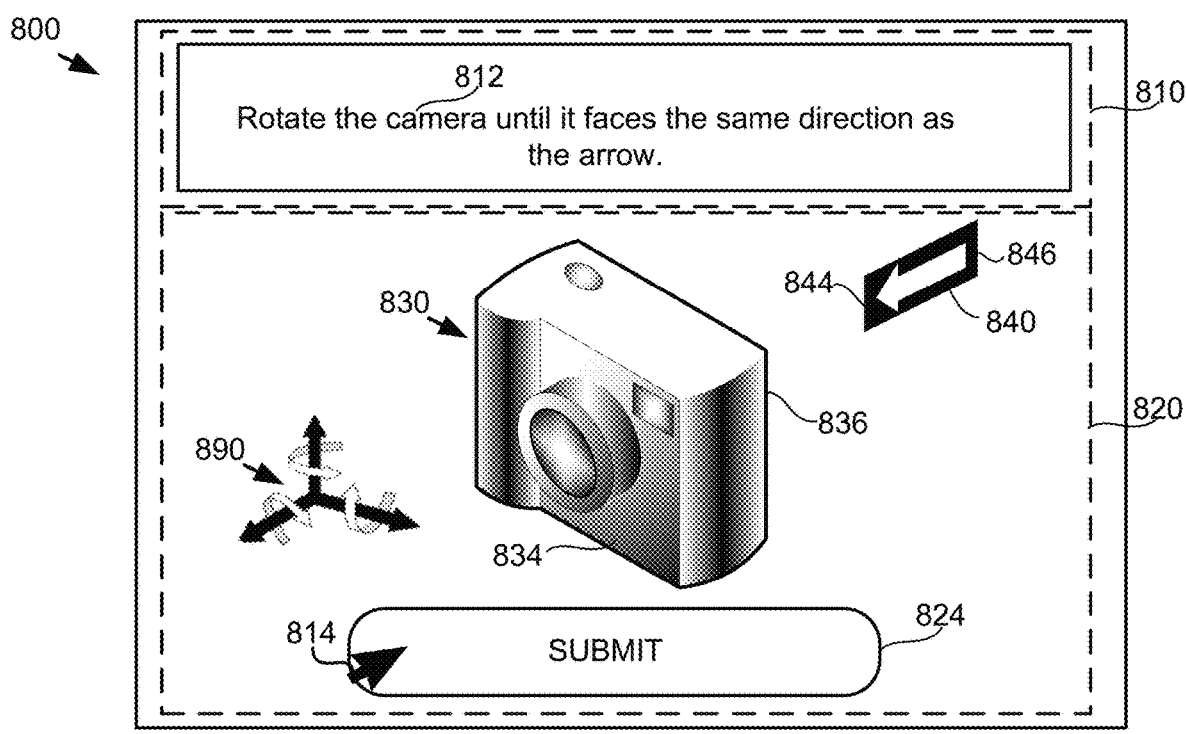
FIG. 8B illustrates an example of a challenge user interface according to some embodiments of the present disclosure.

FIGS. 8A to 8E illustrate examples of a challenge user interface 800 according to some embodiments of the present disclosure. FIG. 8A illustrates an example of the challenge user interface 800 in which an object 830 is manipulated to match an alignment indicator 840, in accordance with some embodiments of the present disclosure. FIG. 8B illustrates the example of FIG. 8A after the object 830 has been manipulated, in accordance with some embodiments of the present disclosure. A description of the elements of FIGS. 8A and 8B that have been previously described will be omitted for brevity.

Referring to FIG. 8A, the challenge user interface 800 may include a challenge request area 810 and a challenge response area 820. The challenge request area 810 may include a challenge text 812. In some embodiments, the challenge text 812 may render the challenge and/or instruction in a readable form. For example, the challenge text 812 may provide an explanation of a task to be performed or a question to be answered utilizing the challenge response area 820. In some embodiments, the challenge text 812 may provide or explain a challenge to be solved as part of interacting with the challenge user interface 800.

The challenge response area 820 may contain one or more objects 830. The one or more objects 830 may have a discernable front portion 834 and rear portion 836. The object 830 may be a commonly-known object 830 for a human, such that the human would recognize, based on real-world knowledge, that the object 830 has a recognizable "front" portion 834 and a "rear" portion 836. For example, the object 830 may be an animal, in which the front portion 834 includes the animal's head and/or eyes, while the rear portion 836 may include the animal's tail and/or back. As another example, the object 830 may be a human, in which the front portion includes the human's face, while the rear portion 836 includes the human's back. Though living beings have been used as examples, the embodiments of the present disclosure are not limited thereto. In some embodiments, as illustrated in FIGS. 8A and 8B, the object 830 may be an inanimate object that is recognized by a human as having a front portion 834 and a rear portion 836. For example, the object 830 may be a camera, where the front portion 834 includes the lens of the camera and the rear portion 836 includes the back and/or viewfinder of the camera. Other examples of appropriate objects include a vehicle in which the front portion 834 includes the portion of the vehicle facing towards the direction of travel (e.g., the hood/headlights of a car) while the rear portion 836 includes the portion of the vehicle facing away from the direction of travel (e.g., the trunk/taillights of a car). Other examples of appropriate objects 830 will be understood by those of ordinary skill in the art.

The object 830 of the challenge response area 820 may be a 2D image, a 3D image, or a 2D rendering of a 3D virtual object. The object 830 may be any suitable type of image such as line drawings as shown in FIG. 8A. In some embodiments, images for the object 830 may be selected to provide a fun game-like experience to the user. Such images may include line drawings and fanciful cartoon-like renderings. In some embodiments, the object 830 may be a high-resolution pixelated image such as a photograph. In such cases, the contrast between pixels may be kept low to prevent a bypasser device 104 or bot 106 from solving the challenge through image processing techniques such as line detection, and the like. The challenge response area 820 may contain a submission button 824 that the user can select to submit the challenge response to the challenge server.

In some embodiments, the challenge text 812 may direct the user to manipulate the object 830 in the challenge response area 820 to match an alignment indicator 840. In some embodiments, the alignment indicator 840 may include an object having a known and/or human-recognizable front portion 844 and rear portion 846. For example, as illustrated in FIG. 8A, the alignment indicator 840 may be an arrow. Other images and/or symbols may be used for the alignment indicator, as would be understood by one of ordinary skill in the art.

The challenge text 812 may direct the user to manipulate the object 830 to face and/or have an orientation in the same direction as an orientation of the alignment indicator 840. In some embodiments, the user may manipulate the object 830 utilizing a manipulation interface, such as cursor 814. For example, the user may click and drag the cursor 814 to move the object 830. In some embodiments, such as tablet devices, the user may manipulate the object 830 by touching the screen of the tablet and dragging the object 830 to rotate it.

In some embodiments, the challenge user interface 800 may allow the object to be manipulated through one or more degrees of rotation, as illustrated by axes 890. For example, the user may be able to click on the object 830 and drag the cursor 814 to rotate the object 830 along one or more axes of rotation. The user may continue to manipulate the object 830 until the user feels the object 830 is facing the same way as the alignment indicator 840, at which point the user may click (e.g., with the cursor 814 or touch-screen input) the submission button 824.

FIG. 8B illustrates the challenge user interface 800 after a user has manipulated the object 830 so that an orientation of the front portion 834 of the object matches the alignment and/or orientation of the alignment indicator 840. As illustrated in FIG. 8B, the submission button 824 may be used to submit the orientation of the object 830 to the challenge server.

As used herein the object 830 matches the alignment and/or orientation of the alignment indicator 840 when the front portion 834 of the object 830 is facing in a same direction as the front portion 844 of the alignment indicator 840. The degree to which the direction of the object and the alignment indicator must match to be considered a correct match may be configurable. For example, in some embodiments, a direction in which the object 830 is facing may be considered matching the direction in which the alignment indicator 840 is facing if the directions are within between −30 and 30 degrees of one another. A direction that the object 830 is facing may be considered, for example, a direction in which a line extends normal to the front portion 834 of the object.

One possible technique that a bot may try to use to gain illicit entry through such an object alignment challenge would be to randomly guess the orientation of the object 830 from all of the possible combinations of orientations. The number of possible combinations will depend on the number of degrees of rotation and the angular increments by which the object 830 can be moved. Accordingly, the difficulty of the challenge to brute force guessing can be increased by increasing the axes by which the object 830 can be rotated and/or reducing the angular increment. The angular increment may be any suitable value, including 90 degrees, 45 degrees, 30 degrees, 10 degrees, 5, degrees, 1 degree, or any value in between.

Though FIGS. 8A and 8B illustrate a single object 830, the embodiments of the present disclosure are not limited thereto. In some embodiments, multiple objects 830 may be present. In some embodiments, the challenge text 812 may request that each of a plurality of objects 830 are oriented to match the alignment indicator 840. In some embodiments, the challenge text 812 may request that one of the plurality of objects 830 match the alignment indicator 840. For example, the challenge response area 820 may illustrate a car object 830 and a camera object 830, and the challenge text 812 may request that the camera object 830 be rotated until it matches alignment with the alignment indicator 840. In such an embodiment, the correct answer may require that both the correct object 830 be selected, and that the alignment and/or orientation of the object 830 substantially match the alignment indicator 840.

Figure 8C:
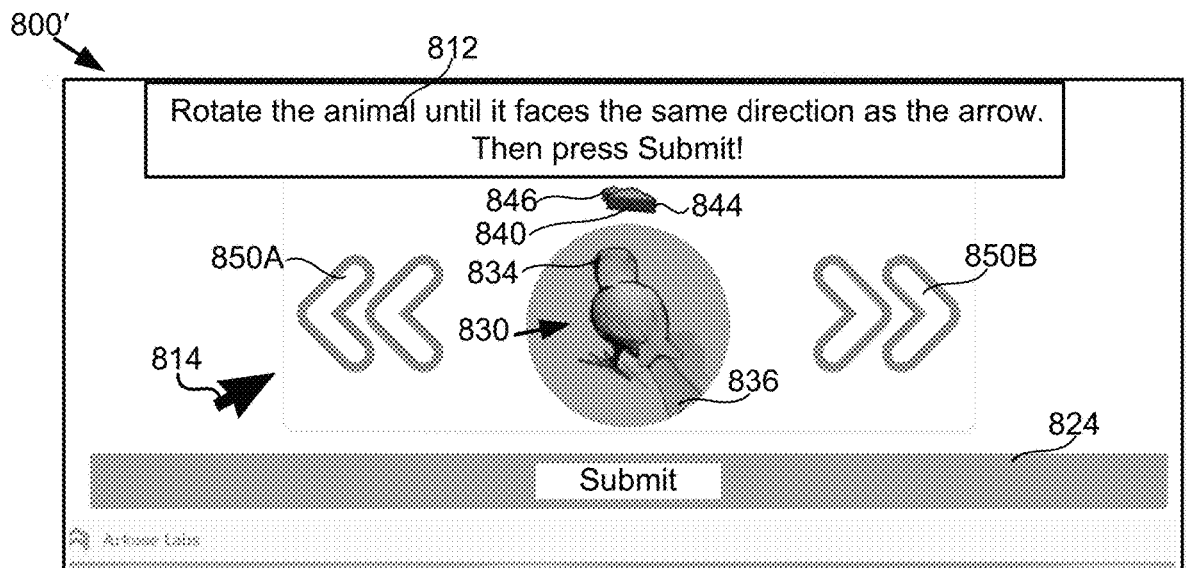
FIG. 8C illustrates an example of a challenge user interface according to some embodiments of the present disclosure.
Figure 8D:
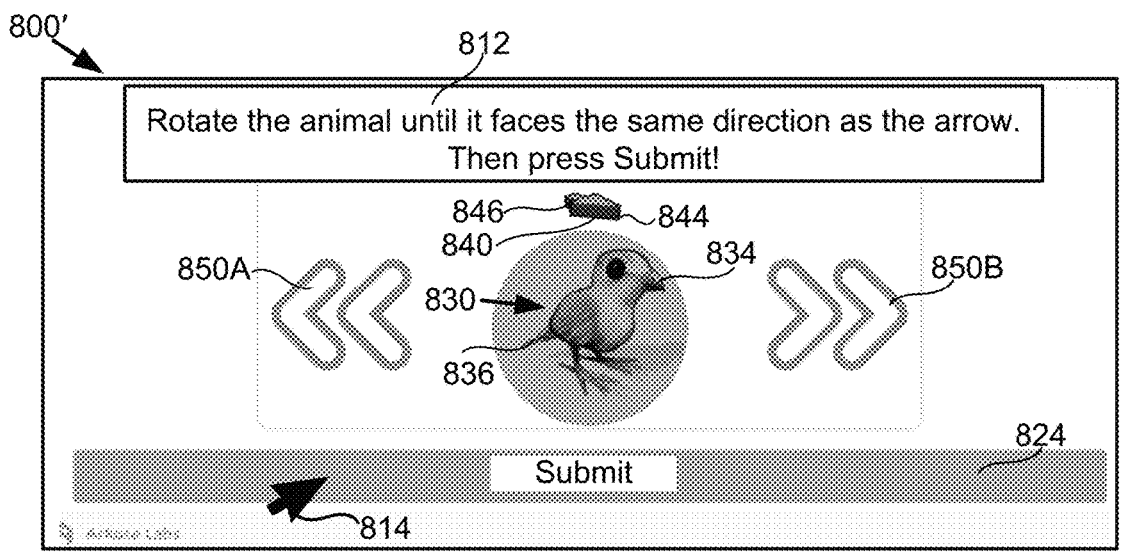
FIG. 8D illustrates an example of a challenge user interface according to some embodiments of the present disclosure.

FIGS. 8C and 8D illustrate an embodiment of a challenge user interface 800' in which different types of controls 850 are provided to rotate an object 830 to match an alignment indicator 840. FIG. 8C illustrates an example of the challenge user interface 800' in which an object 830 is manipulated utilizing controls 850, in accordance with some embodiments of the present disclosure. FIG. 8D illustrates the example of FIG. 8C after the object 830 has been manipulated, in accordance with some embodiments of the present disclosure. A description of elements of FIGS. 8C and 8D that have been previously described will be omitted for brevity.

Referring to FIG. 8C, the rotation of the object 830 may be controlled by controls 850. For example, as illustrated in FIG. 8C, a first control 850A may be provided that rotates the object 830 in a first direction (e.g., to the left in FIG. 8C) and a second control 850B may be provided that rotates the object 830 in a second direction (e.g., to the right in FIG. 8C). Clicking and/or selecting the controls 850A, 850B may result in the rendering of the object 830 such that the object 830 appears to rotate and/or pivot three-dimensionally. For example, as illustrated in FIG. 8C, selecting the first control 850A may cause the object 830 to pivot in a clockwise direction when viewed from above in a 3D virtual space. Similarly, selecting the second control 850B may cause the object 830 to pivot in a counter-clockwise direction when viewed from above in a 3D virtual space.

The user may manipulate, for example, the cursor 814 to interact with the controls 850A, 850B to rotate the object 830 such that a direction of the front portion 834 of the object 830 is facing and/or oriented in substantially the same direction as the front portion 844 of the alignment indicator 840. In some embodiments, an amount of rotation of the object 830 that occurs with each click and/or press of the controls 850A, 850B may be configurable. For example, the angular increment associated with the controls 850A, 850B may be any suitable value, including 90 degrees, 45 degrees, 30 degrees, 10 degrees, 5, degrees, 1 degree, or any value in between. The degree of rotation may refer to an amount the object 830 rotates and/or pivots in a virtual space with looking down on the object 830.

FIG. 8D illustrates the challenge user interface 800' after a user has manipulated the controls 850A, 850B such that the front portion 834 of the object 830 matches the alignment and/or orientation of the alignment indicator 840. As illustrated in FIG. 8D, the submission button 824 may be used to submit the orientation of the object 830 to the challenge server.

According to some embodiments of the present disclosure, the alignment indicator 840 may take several forms. For example, in FIGS. 8A to 8D, the alignment indicator 840 was an arrow, but the embodiments of the present disclosure are not limited thereto. In some embodiments, the alignment indicator 840 may be provided by another image and/or object. For example, referring to FIG. 8E, a challenge user interface 800" is illustrated in which the alignment indicator 840 is part of an indicator image 860, in accordance with some embodiments of the present disclosure.

Figure 8E:
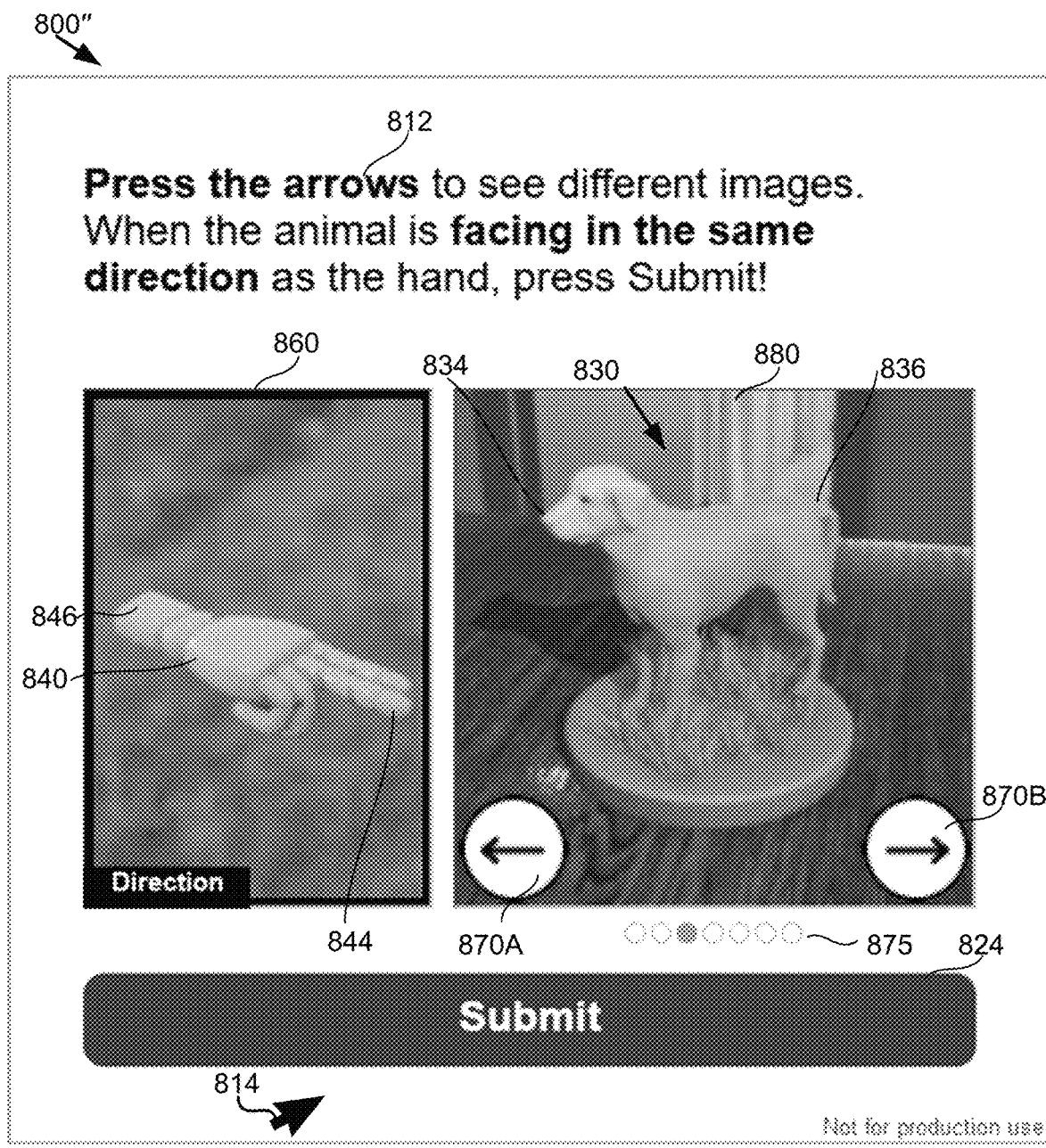
FIG. 8E illustrates an example of a challenge user interface according to some embodiments of the present disclosure.

Referring to FIG. 8E, the alignment indicator 840 may be within an indicator image 860 (e.g. in the challenge response area 820). The indicator image 860 may include one or more objects having a discernable front portion 844 and rear portion 846 such that the object within the indicator image 860 may serve as the alignment indicator 840. In FIG. 8E, the indicator image 860 includes a hand with a pointing finger. A human utilizing the challenge user interface 800" would recognize the extended fingers of the hand as the indicated front portion 844 of the alignment indicator 840. In some embodiments, the challenge text 812 may further identify what portion of the indicator image 860 is to serve as the alignment indicator 840. For example, the challenge text 812 may indicate that the object 830 is to be rotated to be oriented in substantially the same direction as the hand of the indicator image 860.

FIG. 8E illustrates an additional mechanism for controlling rotation of the object 830. The rotation of the object 830 may be controlled by controls 870 which cycle through a series of object images 880 of the object 830 in different poses. For example, as illustrated in FIG. 8E, a first control 870A may be provided that moves in a first direction (e.g., to the left in FIG. 8E) through a series of object images 880 of the object 830, and a second control 870B may be provided that moves in a second direction (e.g., to the right in FIG. 8E) through the series of object images 880 of the object 830. In some embodiments, the current location in the series of object images 880 may be indicated by an image indicator 875.

Each of the object images 880 in the series of object images 880 of the object 830 may illustrate the object 830 in one of a series of poses. Each of the poses may illustrate the object 830 facing a different direction. Clicking and/or selecting the controls 870A, 870B may move through the series of object images 880 such that the object 830 appears to rotate and/or pivot three-dimensionally. For example, as illustrated in FIG. 8E, selecting the first control 870A may cause the object 830 to appear to pivot in a clockwise direction when viewed from above in a 3D virtual space. Similarly, selecting the second control 870B may cause the object 830 to appear to pivot in a counter-clockwise direction when viewed from above in a 3D virtual space.

The user may manipulate, for example, the cursor 814 to interact with the controls 870A, 870B to rotate the object 830 such that a direction of the front portion 834 of the object 830 is facing and/or has an orientation in substantially the same direction as the front portion 844 of the alignment indicator 840 of the indicator image 860. In some embodiments, an amount of rotation of the object 830 that occurs with each click and/or press of the controls 870A, 870B may be based on the number of object images 880 that are provided for the challenge user interface 800". When the user feels that the object 830 is facing in substantially the same direction as the alignment indicator 840, the user may select the submission button 824.

In embodiments similar to FIG. 8E, since the movement of the object 830 may be limited by the number of the object images 880, the user may be prompted (e.g., by challenge text 812) to select the image of the object images 880 that is closest to the direction and/or orientation of the alignment indicator 840. Thus, the direction of the object 830 in the object image 880 may vary from the direction of the alignment indicator 840 by a larger margin than in other embodiments, but the pose of the object 830 in the correct object image 880 may be closer to the direction of the alignment indicator 840 than other ones of the object images 880.

Though FIGS. 8A to 8E illustrate challenge text 812 that indicates the object 830 should be oriented in a same direction as the alignment indicator 840, the embodiments of the present disclosure are not limited thereto. In some embodiments, the challenge text 812 may indicate that the object 830 should be oriented opposite to the alignment indicator 840. In some embodiments, the challenge text 812 may indicate that the object 830 should be oriented orthogonally to the alignment indicator 840.

Figure 9:
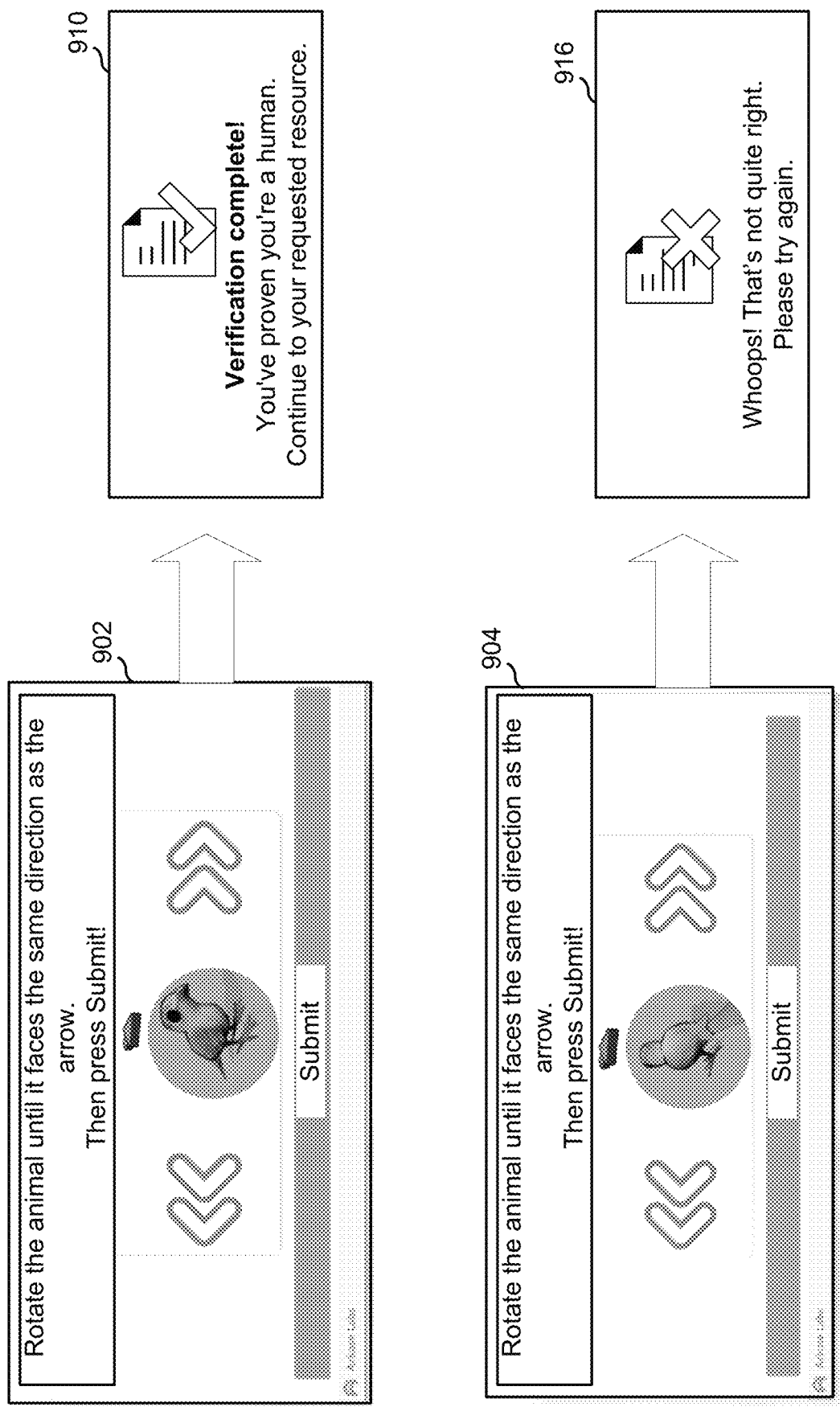
FIG. 9 depicts an example of an operation of checking user responses, according to an embodiment of the present disclosure.

FIG. 9 depicts an example of an operation of checking user responses, according to an embodiment of the present disclosure. A challenge creation system may be used to create challenges that are to be presented to users. The challenge creation system may include an image editing system that performs tasks that enable a challenge creator to create, manipulate, and render images in creating the challenges. A challenge may be stored electronically as a data object having structure, such as program code, images, parameters for their use, etc. The challenge server may be provided a set of these data structures and serve them up as requested.

In the illustration of FIG. 9, a challenge presentation may be in the form of an object and alignment indicator, which are oriented as shown in FIGS. 8C and 8D. When the user presses the submit button, the user adjustment that has been made to the object may be submitted to the challenge server. The challenge server can determine whether the user adjustments resulted in a correct object alignment and/or orientation by comparing the user adjustments to an answer key that describes the adjustments that result in alignment with the alignment indicator. A response to the correct user manipulation of the object that aligns an orientation of the object with that of the alignment indicator may be the success message 910.

On the other hand, if the user input fails to align the object with the alignment indicator as shown by image 904, the user input submitted to the challenge server will not match the answer key, in which case the user may receive a fail message 916 and, in some embodiments, may be allowed to try again. If the user is allowed to try again, the user may be presented with a different challenge presentation corresponding with a different challenge data object (e.g., different object types and positions, different alignment indicator types and orientations, etc.).

In some embodiments, the challenge creation system can create a large number of different challenges from small variations. By being able to create a large number of distinct challenges from a single class, the ratio of effort by challenge creators and users can be kept low. The variations of the challenges may not be such that a computer process can easily process any one of those to guess the correct human expectation of the challenge.

A challenge creator, such as a 3D artist, puzzle maker, or other challenge creator, may use a modelling program to create one or more virtual objects and give each one various visual properties, for example shape, texture, and animation routine. A challenge creator may give each virtual object some simulated physical properties, for example flexibility, bounciness, transparency, weight, and friction. The challenge creator can then use the modelling program to create a virtual scene in which various virtual objects can be placed and manipulated.

The challenge creator can use the modelling program to create a virtual camera that surveys the virtual scene. The camera may be in an arbitrary position and aimed in an arbitrary direction, within constraints specified by the challenge creator.

The challenge creator can use the modelling program to create virtual lights that light up the virtual scene and the virtual objects within it, producing shades of color and texture, shadows, highlights, and reflections. The lights may be in arbitrary positions and aimed in an arbitrary direction, perhaps within constraints specified by the challenge creator.

The challenge creator can direct the modelling program to render a series of images (2D or otherwise) that are captured by the virtual camera, showing the virtual objects in different orientations in the virtual scene lit by the virtual lights. The images can represent a sequence over time, so that as the objects move and/or rotate, each image shows the objects in a different position. This rendering process produces an animated image sequence comprising one or more frames, each frame rendered in sequence over time. The modelling program can also produce a list of properties that the virtual objects have. The list may include the property of correctness, this being whether the image was produced from a set of virtual objects that either do or do not serve as a correct answer to a question that demands whether the objects satisfy a specific criterion. If the virtual objects satisfy the criterion, the image is associated with a property of "correct." If the virtual objects do not satisfy the criterion, the image is associated with a property of "incorrect." The modelling program stores and associates the image and the list of properties of the virtual objects in the scene, including the property of correctness, possibly in the form of an answer key that a computer process can compare to user responses to prompts presented to the user. As images are stored as part of a data structure representing a challenge, one data element may be the images' correctness property.

The images and the possible input values may be specified by the challenge creator and used by the modelling system to create specific challenge presentations to be presented to users. The modeling system can generate a challenge presentation by randomly selecting an image from the image store, and selecting a set of image alterations to be applied to the image. For example, a challenge type may be selected randomly from the set of challenge types specified by the challenge designer, wherein the challenge type specifies a particular orientation of an object of the image. The modeling system can also randomly select from the set of input values, the rotation or shift values to the be applied to the object and/or the rotation or shift values to be applied to an alignment indicator.

The alignment indicator and/or the object may then be generated by applying the selected input values to the tiles according to the challenge type. The challenge data object may include information that describes the user manipulation of the image that constitutes a correct response. For example, the correct response may be an angle of rotation or other manipulation to be applied to the object to match a particular alignment indicator. The known correct response, or range of acceptable responses, may be stored in a data element referred to as an answer key. The answer key typically is not available to the user device in a computer processable form but may be easily determined by a human. An answered challenge may be represented by a data structure that comprises the elements of the challenge and the user response to the challenge.

When the user has rotated or otherwise moved the object 830 such that the user is satisfied that the image has been aligned with the alignment indicator 840, the user can submit their answer, for example, by activating the submission button 824. The user alterations to the object 830 may be conveyed to the challenge server. For example, the user alterations may be expressed as degrees of rotation applied to the rotatable object, a number of rotations applied to the object, or a particular image of a series of images that was selected. The amount of rotation may be in any suitable units such as degrees, or an arbitrary unit that relates to different orientations of the object 830. For example, if the object 830 can be rotated to one of 10 possible orientations, the orientations may be numbered 1 to 10. The challenge server compares the user alterations given by the user device to the answer key to determine whether the user has successfully completed the challenge.

In FIGS. 8A to 8E challenge user interfaces 800, 800', 800" were illustrated in which an express alignment indicator 840 is provided to provide an indication in which a particular object 830 is to be aligned. However, embodiments of the present disclosure are not limited to such a configuration. In some embodiments, the alignment direction may be implied by the way the object is presented. For example, in some embodiments, an object may be broken into disjoint portions, and a challenge is provided to the user to align the disjoint portions into a whole image that illustrates the object.

Figure 10A:
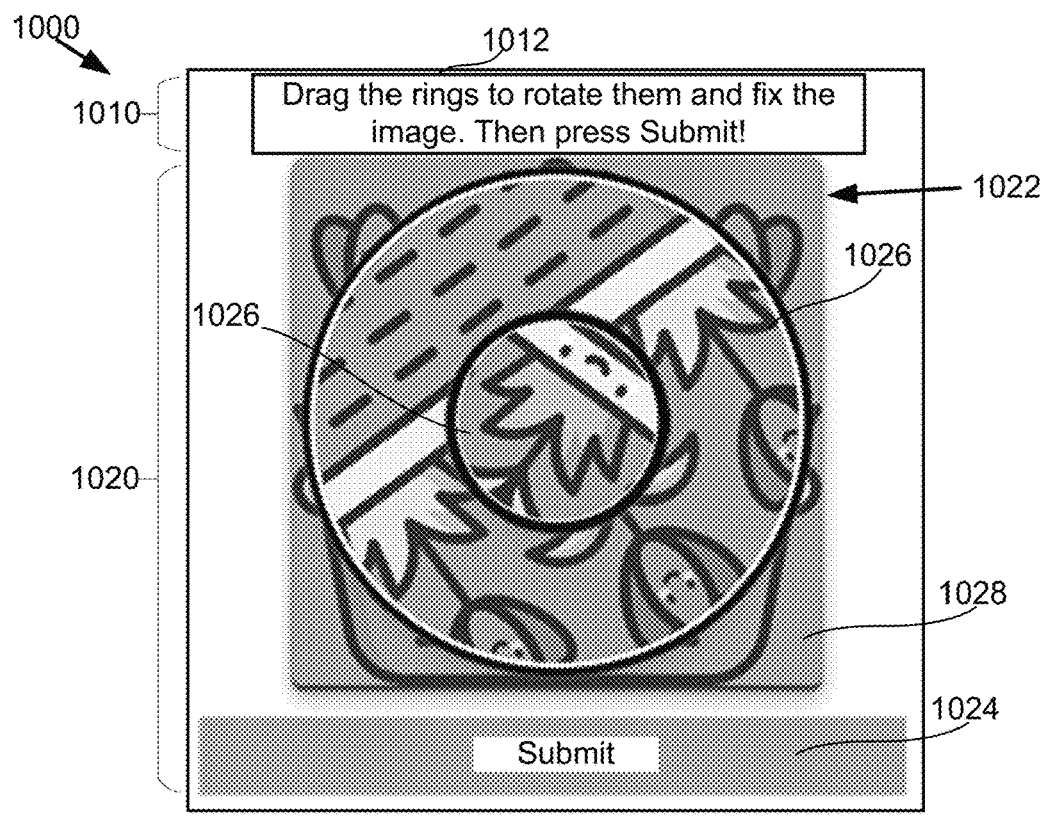
FIG. 10A illustrates an example of the challenge user interface in which a disjointed image is manipulated, in accordance with some embodiments of the present disclosure.
Figure 10B:
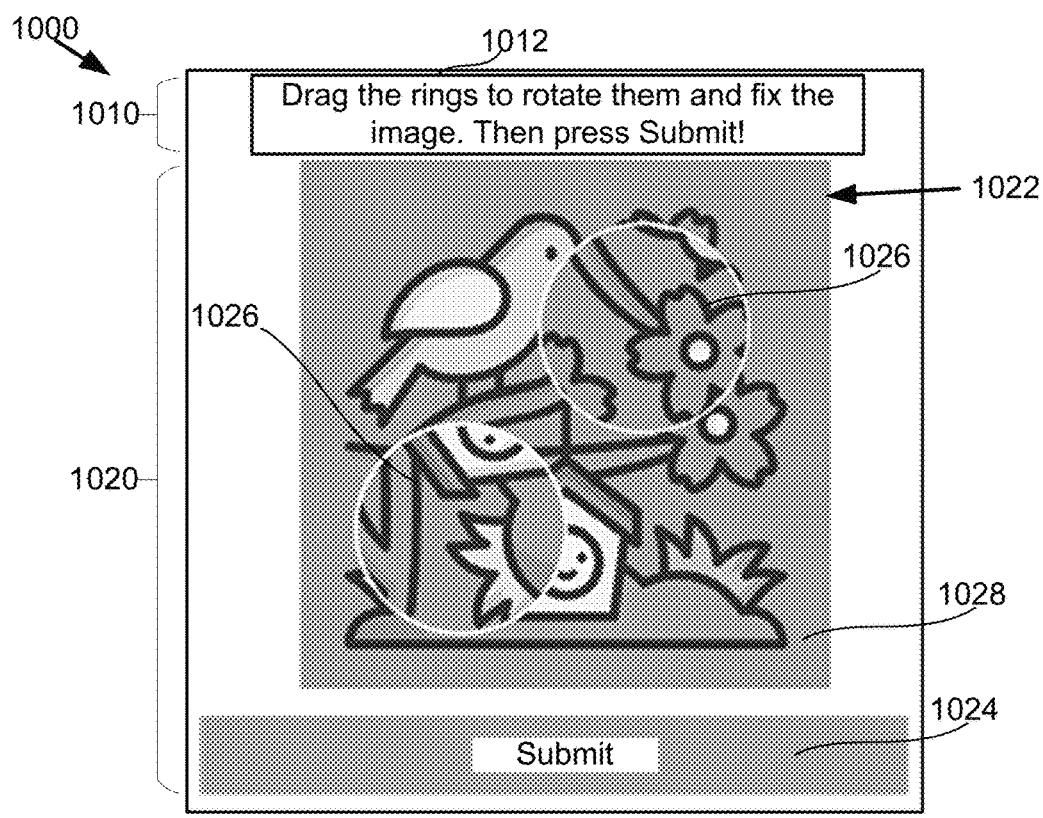
FIG. 10B illustrates another example of a challenge user interface according to some embodiments of the present disclosure.
Figure 10C:
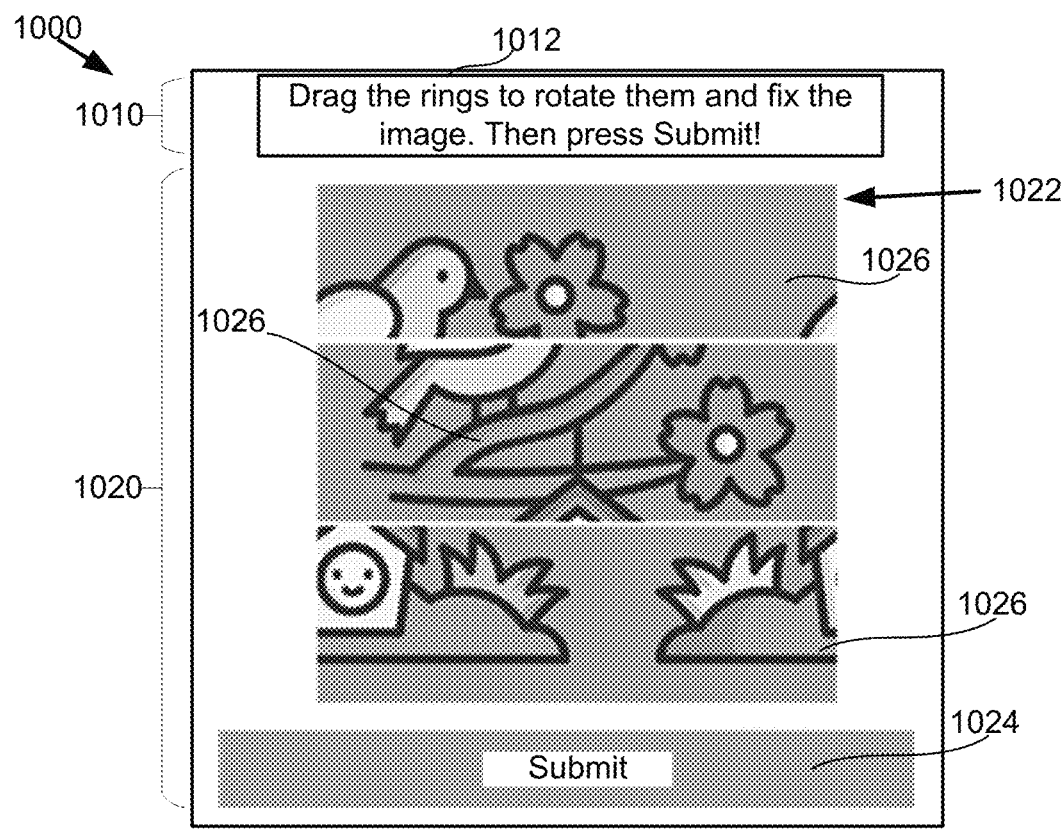
FIG. 10C illustrates another example of a challenge user interface according to some embodiments of the present disclosure.

FIGS. 10A, 10B, and 10C illustrate examples of a challenge user interfaces 1000 according to some embodiments of the present disclosure. A description of elements of FIGS. 10A to 10C that have been previously provided will be omitted for brevity. FIG. 10A illustrates an example of the challenge user interface 1000 in which a disjointed image 1022 is manipulated, in accordance with some embodiments of the present disclosure. Referring to FIG. 10A, the challenge user interface 1000 may include a challenge request area 1010 and a challenge response area 1020.

The challenge request area 1010 may include a challenge text 1012. In some embodiments, the challenge text 1012 may render the challenge and/or instruction in a readable form. For example, the challenge text 1012 may provide an instruction to the user to "align" or "fix" the image presented in the challenge response area 1020. In some embodiments, challenge request area 1010 and the challenge text 1012 may be omitted, in which case, it may be left to the user to deduce the nature of the challenge from the disjointed image and the maneuverability of the tiles that form the disjointed image.

The challenge response area 1020 may contain a disjointed image 1022 divided into two or more tiles 1026 (also referred to herein as objects), at least some of which are movable. The objects and/or tiles 1026, when properly aligned, may render or display a particular image or scene. As previously described with respect to FIGS. 8A to 8E, solving the challenge represented by the disjoint image 1022 may include manipulating the tiles 1026 so as to match an alignment of the object of the image.

For example, aligning a tile 1026 may include rotating, sliding, and/or otherwise moving the tile 1026 until a first portion of the disjointed image 1022 displayed on the tile 1026 aligns with a second portion of the disjointed image 1022 adjacent the tile 1026. For example, aligning the portions of the disjointed image 1022 may include moving the tile 1026 until a line displayed on the tile 1026 matches up to a corresponding line in the second portion of the disjointed image 1022 adjacent the tile 1026. As another example, aligning the portions of the disjointed image 1022 may include moving the tile 1026 until a portion of an object of the image 1022 displayed in the first portion of the tile 1026 lines up with another portion of the same object within the image 1022 so as to form a whole and/or non-disjoint version of the object.

The disjointed image 1022 may be any suitable type of image such as line drawings as shown in FIG. 10A. In some embodiments, images may be selected to provide a fun game-like experience to the user. Such images may include line drawings and fanciful cartoon-like renderings. In some embodiments, the image may be a high-resolution pixelated image such as a photograph. In such cases, the contrast between pixels may be kept low to prevent a bypasser device 104 or bot 106 from solving the challenge through image processing techniques such as line detection, and the like. The challenge response area 1020 may contain a submission button 1024 that the user can select to submit the challenge response to the challenge server.

Figure 11:
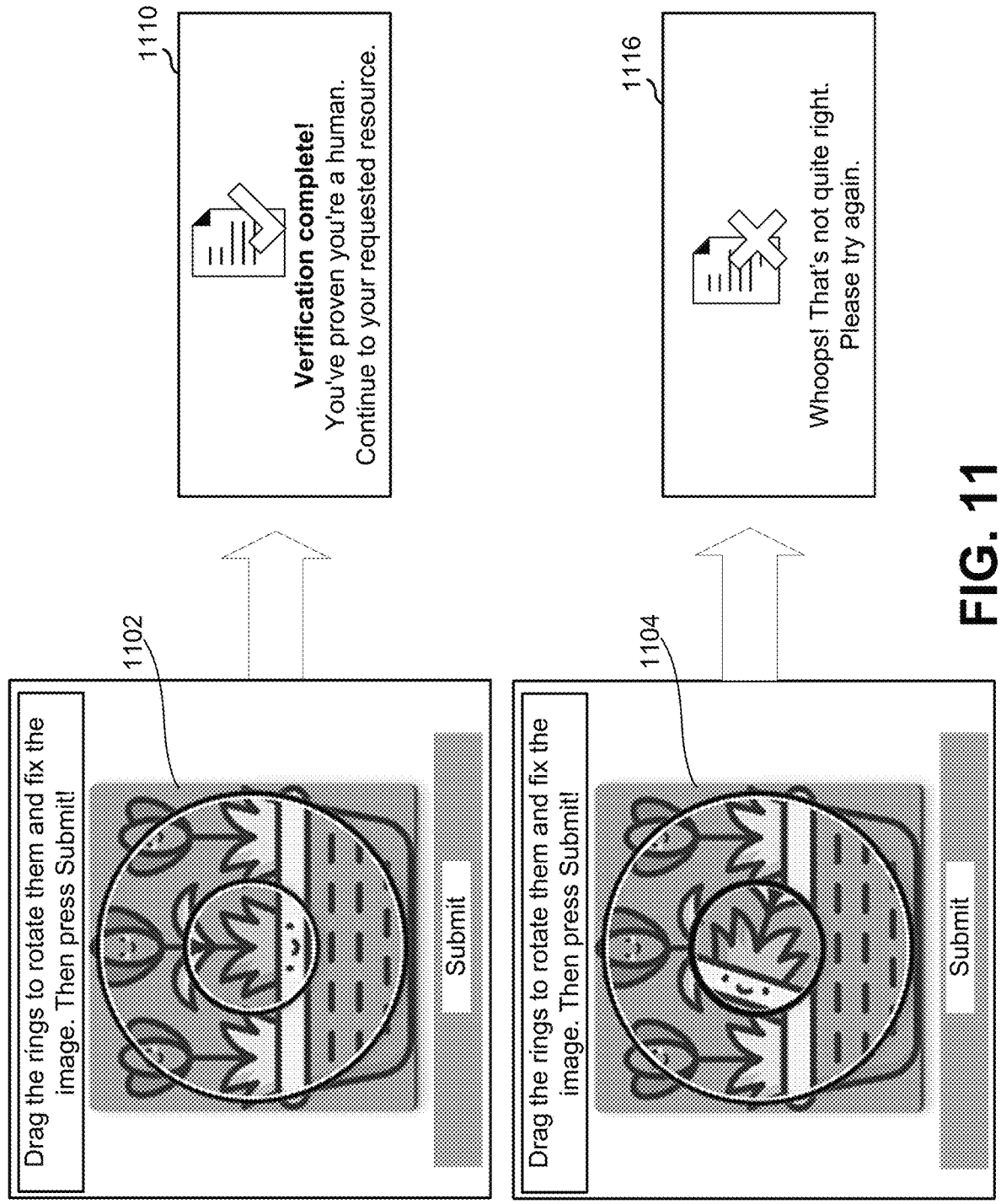
FIG. 11 depicts an example of an operation of checking user responses of the challenge user interfaces of FIGS. 10 to 10C, in accordance with some embodiments, of the present disclosure.

In the embodiment shown in FIG. 10A, the image is divided into two movable tiles 1026 and a background tile 1028. The background tile 1028 may be an immovable portion of the image that serves as alignment feature that dictates the proper alignment of the movable tiles 1026. In this example, the movable tiles 1026 are concentric circles that are rotatable by the user, for example, by clicking and dragging or through touch-screen inputs. In some embodiments, the rotation may be along an axis of rotation that is perpendicular to the challenge user interface 1000. The object of the challenge is to rotate the movable tiles 1026 to the defined alignment and/or orientation that results in image alignment. Image alignment is achieved when the portions of the image in each tile line up with one another to form the original, unbroken image (as shown in FIG. 11, reference element 1102 for example). Aligning a disjointed image 1022 in this way is generally very easy for a human but may be difficult for a bot. Additionally, the puzzle-like nature of the challenge may provide a small degree of amusement for users while also being somewhat time consuming and tedious for human bypassers trying to solve a large number of challenges in succession.

One possible technique that a bot may try to use to gain illicit entry through such an image alignment challenge would be to randomly guess the orientation of the tiles from all of the possible combinations of orientations. The number of possible combinations will depend on the number of movable tiles 1026 and the angular increments by which the tiles 1026 can be moved. Accordingly, the difficulty of the challenge to brute force guessing can be increased by increasing the number of movable tiles 1026 and reducing the angular increment. Embodiments of the present techniques may be implemented with any suitable number of rotatable tiles 1026, including a single tile, two tiles, three tiles, four tiles, five tiles, or more. The angular increment may be any suitable value, including 90 degrees, 45 degrees, 30 degrees, 10 degrees, 5, degrees, 1 degree, or any value in between.

FIG. 10B illustrates another example of a challenge user interface 1000 according to some embodiments of the present disclosure. The challenge user interface shown in FIG. 10B is similar to the user interface shown in FIG. 10A, and optionally includes a challenge request area 1010 and a challenge text 1012 requesting the user to align and/or fix the disjointed image 1022. Additionally, the challenge response area 1020 also contains the disjointed image 1022 divided into two or more movable tiles 1026 positioned over a background tile 1028. In this embodiment, the movable tiles 1026 are not concentric but rather are separate portions of the image 1022. The movable tiles 1026 shown in FIG. 10B do not overlap. However, in some embodiments, the movable tiles 1026 may overlap one another.

Similar to the embodiment of FIG. 10A, the movable tiles 1026 are rotatable and the object of the challenge is to rotate each of the movable tiles 1026 to the correct orientation within the image 1022. FIG. 10B shows two tiles. However, the image 1022 can include any suitable number of movable tiles 1026 and each tile 1026 may be rotatable in any suitable angular increment depending on the desired level of difficulty to random guessing. For example, the image 1022 may include one, two, three, four, five, or more tiles 1026, rotatable increments of 90 degrees, 45 degrees, 30 degrees, 10 degrees, 5 degrees, 1 degree or any value in between. Additionally, some of the movable tiles 1026 may be separated as shown in FIG. 10B while two or more tiles 1026 may be concentric as shown in FIG. 10A. Additionally, although the movable tiles 1026 are shown as being arranged in a diagonal pattern, the movable tiles 1026 may be arranged in any suitable pattern or as at seemingly random positions. The movable tiles 1026 may also be all the same size or a variety of different sizes.

FIG. 10C illustrates another example of a challenge user interface 1000 according to some embodiments of the present disclosure. The challenge user interface shown in FIG. 10C optionally includes a challenge request area 1010 and a challenge text 1012 requesting the user to align and/or fix the image 1022. Additionally, the challenge response area 1020 also contains the disjointed image 1022 divided into two or more movable tiles 1026. However, in this embodiment, the movable tiles 1026 are rectangular and slidable rather than round and rotatable. Each tile 1026 may span the entire width of the image 1022 and may be slidable to the left and right. In some embodiments, the segments of the image 1022 within each tile 1026 can be configured to wrap around past the side boundaries, such that portions of the image 1022 can slide past the right boundary and reappear at the left boundary. In other embodiments, portions of the image 1022 that slide past a side boundary may be hidden.

As in previous examples, the object of the challenge is to align the tiles 1026 to the correct orientation that forms the full unbroken image 1022. In some embodiments, the disjointed image 1022 can also optionally include an immovable background tile to which the other tiles 1026 are to be aligned. Additionally, the disjointed image 1022 can be divided into any suitable number of movable tiles 1026 depending on the desired difficulty. The motion increments may be characterized in terms of a specified number of pixels. In embodiments in which the image 1022 wraps around, motion increments may be characterized in terms of an angular increment.

The challenge user interfaces 1000 shown in FIGS. 10A, 10B, and 10C are only examples of interfaces that can be used to challenge a user to realign a disjointed image 1022. Various modifications may be made to the above examples without deviating from the scope of the present disclosure. For example, the rotatable tiles 1026 may be shapes other than circular, and the slidable tiles 1026 may move vertically rather than horizontally. Some embodiments may include a combination of the features described above. For example, some embodiments may include a combination of slidable and rotatable tiles 1026.

FIG. 11 depicts an example of an operation of checking user responses of the challenge user interfaces 1000 of FIGS. 10 to 10C, in accordance with some embodiments of the present disclosure. A challenge creation system may be used to create challenges that are to be presented to users. The challenge creation system may include an image editing system that performs tasks that enable a challenge creator to create, manipulate, and render images in creating the challenges. A challenge may be stored electronically as a data object having structure, such as program code, images, parameters for their use, etc. The challenge server may be provided a set of these data structures and serve them up as requested.

In the illustration of FIG. 11, a challenge presentation may be in the form of a disjointed image that includes a background tile, and two concentric rotatable tiles, which are oriented as shown in FIG. 10A. When the user presses the submit button, the user adjustment that has been made to each of the tiles may be submitted to the challenge server. The challenge server can determine whether the user adjustments resulted in image alignment by comparing the user adjustments to an answer key that describes the adjustments that result in alignment. In the challenge illustrated in FIG. 10A, the user is expected to rotate the outer tile by about 145 degrees counterclockwise and rotate the inner tile by about 135 degrees clockwise (or 225 degrees counterclockwise) to produce the unbroken image 1102. A response to that user manipulation of the image may be the success message 1110.

On the other hand, if the user input fails to align the image as shown by image 1104, the user input submitted to the challenge server will not match the answer key, in which case the user may receive a fail message 1116 and, in some embodiments, may be allowed to try again. If the user is allowed to try again, the user may be presented with a different challenge presentation corresponding with a different challenge data object (e.g., different image, different tile types and positions, different image orientations, etc.).

In some embodiments, the challenge creation system can create a large number of different challenges from small variations. By being able to create a large number of distinct challenges from a single class, the ratio of effort by challenge creators and users can be kept low. Ideally, the variations of the challenges are not such that a computer process can easily process any one of those to guess the correct human expectation of the challenge.

A challenge creator, such as an artist, puzzle maker, or other challenge creator, may use a modelling program to create one or more image orientation images. The modelling program can store a set of non-disjointed images that can be drawn upon to create the challenges. The modelling program can also store a set of possible input values that describe the image alterations that can be applied to the image to make it disjointed. For example, the input values can describe the number of movable tiles, their size and position within the image, the nature of each tile, (e.g., rotatable, slidable). In some embodiments, a set of challenge types may be defined, wherein each challenge type relates to a specific set of tile specifications, i.e., the number of tiles, their sizes, positions, etc. The input values can also include a degree of rotation or lateral shift that can be applied to specific movable tiles.

The images and the possible input values may be specified by the challenge creator and used by the modelling system to create specific challenge presentations to be presented to users. The modeling system can generate a challenge presentation by randomly selecting an image from the image store, and selecting a set of image alterations to be applied to the image. For example, a challenge type may be selected randomly from the set of challenge types specified by the challenge designer, wherein the challenge type specifies the type of image alterations (e.g., the number of rings and their positions within the image). The modeling system can also randomly select from the set of input values, the rotation or shift values to the be applied to each of the tiles.

The disjointed image may then be generated by applying the selected input values to the tiles according to the challenge type. The challenge data object may include information that describes the user manipulation of the image that constitutes a correct response. For example, the correct response may be an angle of rotation or lateral shift to be applied to each tile to bring the image back into alignment. The known correct response, or range of acceptable responses, may be stored in a data element referred to as an answer key. The answer key typically is not available to the user device in a computer processable form but may be easily determined by a human. An answered challenge may be represented by a data structure that comprises the elements of the challenge and the user response to the challenge.

When the user has rotated, shifted, or otherwise moved the movable tiles such that the user is satisfied that the image has been realigned, the user can submit their answer, for example, by selecting select the submit button 1024. The user alterations to the image may are conveyed to the challenge server. For example, the user alterations may be expressed as degrees of rotation applied to each rotatable tile. The amount of rotation may be in any suitable units such as degrees, or an arbitrary unit that relates to different orientations of the tile. For example, if the tile can be rotated to one of 10 possible orientations, the orientations may be numbered 1 to 10. The challenge server compares the user alterations given by the user device to the answer key to determine whether the user has successfully completed the challenge.

Figure 12:
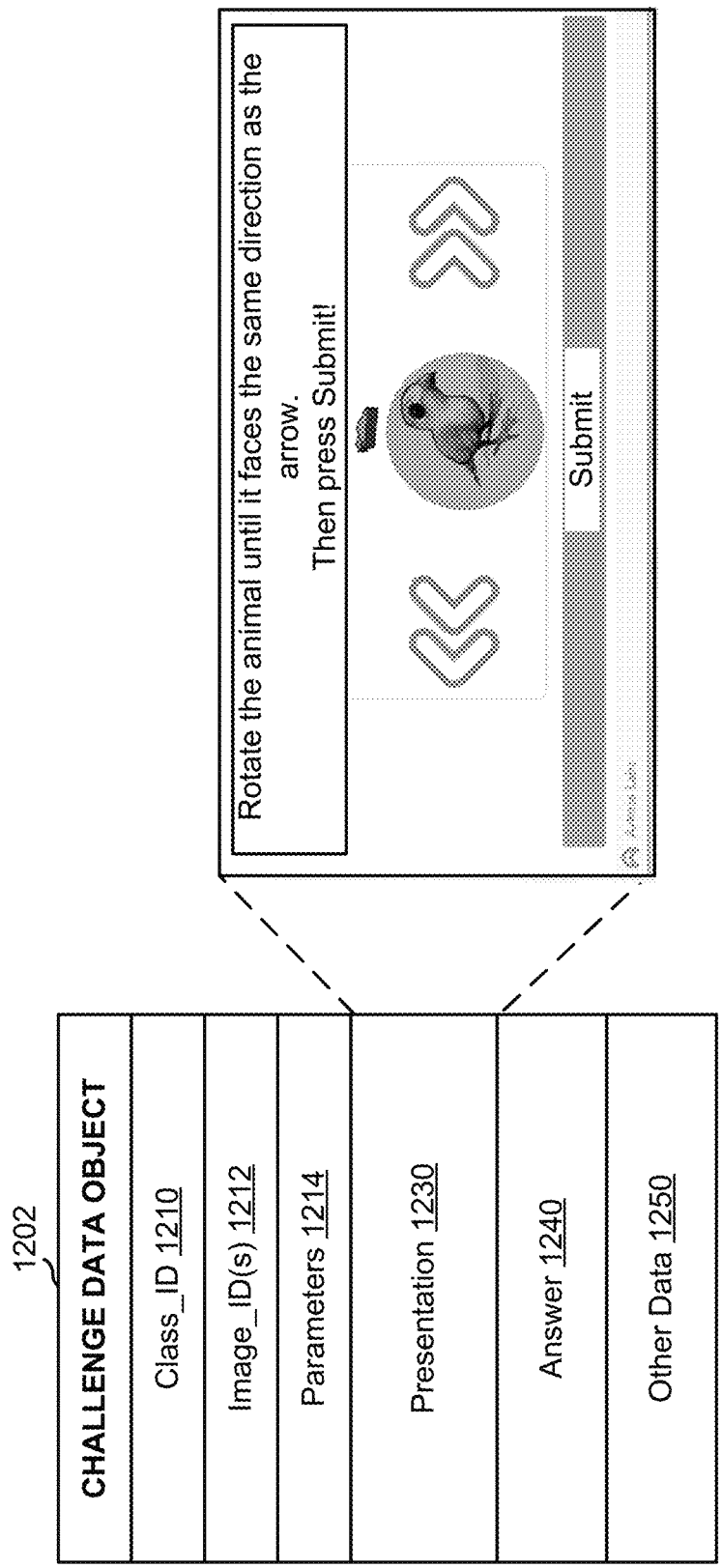
FIG. 12 illustrates an example of a challenge data object, showing an image that may be presented to a user device, data fields indicating properties of the image, and other data, in accordance with some embodiments of the present disclosure

FIG. 12 illustrates an example of a challenge data object 1202, showing an image that may be presented to a user device, data fields indicating properties of the image, and other data, in accordance with some embodiments of the present disclosure. Though FIG. 12 illustrates an example in which the user interface is similar to those described herein with respect to FIGS. 8A to 8E, this is only for ease of explanation. It will be understood the that the challenge data object 1202 may be similarly used for the examples of the alignment user interfaces of FIGS. 10A to 10C. A description of elements of FIG. 12 that have been previously provided will be omitted for brevity.

The challenge data object 1202 may include an image ID 1212 that specifies a particular image included in the challenge presentation. The challenge data object 1202 may also include a class ID 1210 that describes the type of challenge and how the challenge is to be processed. For example, the class ID 1210 may indicate that the nature of the challenge is to manipulate an object 830 to match an alignment indicator 840, as described herein with respect to FIGS. 8A to 8E. As another example, the class ID 1210 may indicate that the nature of the challenge is to realign a disjointed image 1022, as described herein with respect to FIGS. 10A to 10C. The challenge data object 1202 may also include a parameters description 1214 that describes the alterations applied to aspects of the challenge, such as the object 830, the alignment indicator 840, and/or the disjointed image 1022. For example, the parameters 1214 may include the rotations applied to the object 830 and/or the positioning of the alignment indicator 840. As another example, the parameters 1214 may include the rotations applied to each rotatable tile 1026 and/or the shifts applied to each slidable tile 1026. In some embodiments, the parameters describing the image alterations are not conveyed to the user device, and the image sent to the user device is altered by the challenge server before it is conveyed to the user device.

The challenge data object 1202 may also include presentation data 1230 that describes aspects or additional details for how the challenge is presented. In some embodiments, the presentation 1230 may include a criterion in the form of a question. A question may be in the form of a selection ("Rotate the animal until it faces the same direction as the arrow."), may be asking about a property of what is depicted in a presentation 1230, may be about the correctness of what is depicted in a presentation, etc. The question of the criterion may, in some embodiments, be utilized to form the challenge text 812, 1012 illustrated in FIGS. 8A to 8E and FIGS. 10A to 10C.

The challenge data object 1202 can also include an answer key 1240. The answer key 1240 may be a separate data field that describes the user the user manipulation that will result in a correct solution to the challenge. The answer key may be based on the parameters describing the image alterations and/or the relative orientation selected for the elements of the images as well as the criterion of the presentation 1230. In some embodiments, the parameters 1214 describing the image alterations may be used as the answer key 1240 and a separate answer key field 1240 may be omitted. In some embodiments, the challenge data object 1202 may include other data 1250 that may be used as part of generating the challenge and/or the challenge user interface 800, 1000.

The challenge server may assemble the challenge data object 1202. The challenge server may send to the user device the challenge, or part thereof, omitting the answer key 1240 and possibly other elements such as the image alteration parameters 1214. Upon receipt, the user device may be configured to display to the user the criterion and the images of a challenge. The user device may also be configured to associate one or more elements of the challenge (e.g., a rotatable object, a movable tile) with a corresponding user input element. The user input element is a portion of the image that coincides with the one or more elements of the challenge (e.g., the rotatable object, the movable tile) and receives user input related to the user manipulation of the challenge element. For example, the user input element may be a graphical user interface element that enables the user to move an object (e.g., rotate an object 830) and/or move a tile 1026 (e.g., rotate or slide). The graphical user interface element can detect and report the user's input when the user submits the challenge response. The user input element may allow the user to click and drag a challenge element (e.g., a rotatable object or tile) to a desired orientation or, in the case of a touch screen, the user can rotate or otherwise move the challenge element through touch.

A user may operate an interface of the user device to choose the correct image alterations that align the image. The user device can then send the alteration information to the challenge server. The challenge server can compare the alterations chosen by the user to the answer key 1240. The challenge server can determine whether the user should receive the service of value (such as access to computer resources) from the value server, and whether the user should complete a new challenge. The determination may be based on whether the user's image manipulations would properly align the image. If the challenge server determines that the user must complete a new challenge, the above process can be repeated. If the challenge server determines that the user should receive the value from the value server, the challenge server can send a directive to the user device that the user device request from the value server the service of value. The challenge server can store information about the challenge, the user, and the determination whether the challenge was successfully completed or not.

The user device can send to the value server a set of validation data describing the challenge and a request that the value server issue the service of value to the user device. The value server sends to the challenge server the validation data. The challenge server compares the validation data to information stored about the challenge and the user, and as a result determines whether the validation data is authentic. If the validation data is authentic, the challenge server replies to the value server that the validation data is authentic. The value server can then decide to issue the service of value to the user device. If so decided, the user receives the service of value.

In a specific embodiment, a system for user authentication includes an authentication server, the authentication server including a processor coupled to a memory, the memory including program code instructions configured to cause the processor to present an authentication challenge to a user of a computing device, the authentication challenge including a number of challenge elements; receive a response to the authentication challenge from the user, the response including a selection and/or movement of one or more challenge elements in accordance with an instruction to the user on how to complete the authentication challenge; notify the user whether the user's choice of challenge element correctly complied with the instruction or not; and if the user correctly complied with the instruction, allow the user to perform a computer operation.

A computing device for user authentication may include a processor coupled to a memory, the memory including program code instructions configured to cause the processor to present an authentication challenge to a user of a computing device, the authentication challenge including a number of challenge elements; receive a response to the authentication challenge from the user, the response including a selection and/or movement of one or more challenge elements in accordance with an instruction to the user on how to complete the authentication challenge; notify the user whether the user's choice of challenge element correctly complied with the instruction or not; and if and only if the user's correctly complied with the instruction, allow the user to perform a computer operation.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 13:
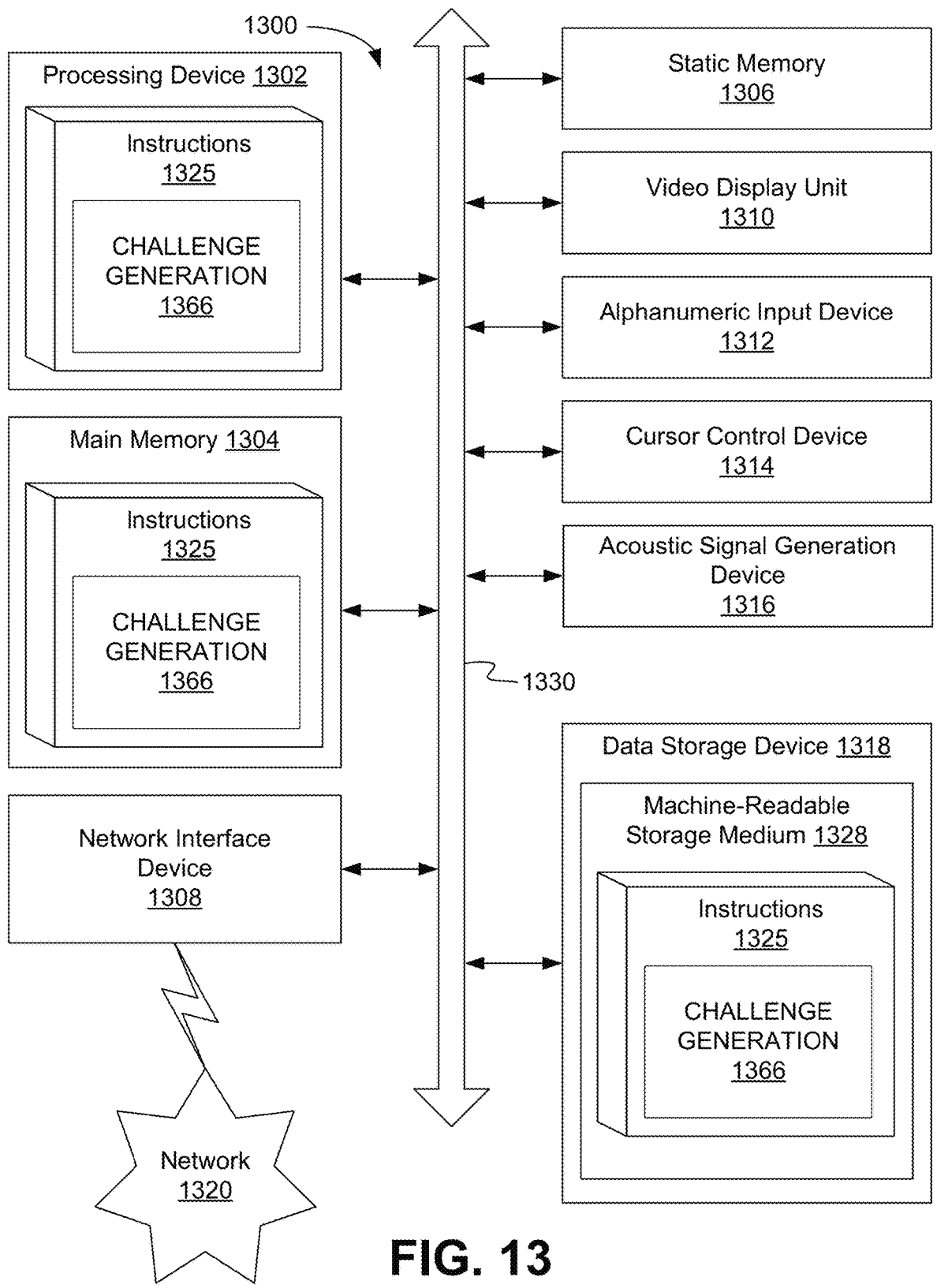
FIG. 13 is a block diagram of an example computing device that may perform one or more of the operations described herein, in accordance some embodiments of the present disclosure.

FIG. 13 is a block diagram of an example computing device 1300 that may perform one or more of the operations described herein, in accordance with one or more aspects of the disclosure. Computing device 1300 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1300 may include a processing device (e.g., a general purpose processor, a PLD, etc.) 1302, a main memory 1304 (e.g., synchronous dynamic random access memory (DRAM), read-only memory (ROM)), a non-volatile memory 1306 (e.g., flash memory and a data storage device 1318), which may communicate with each other via a bus 1330.

Processing device 1302 may be provided by one or more general-purpose processing devices such as a microprocessor, central processing unit, or the like. In an illustrative example, processing device 1302 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1302 may also include one or more special-purpose processing devices such as an application specific integrated circuit (ASIC), a field programmable gate array (FPGA), a digital signal processor (DSP), network processor, or the like. The processing device 1302 may execute the operations described herein, in accordance with one or more aspects of the present disclosure, for performing the operations and operations discussed herein.

Computing device 1300 may further include a network interface device 1308 which may communicate with a network 1320. The computing device 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse) and an acoustic signal generation device 1316 (e.g., a speaker). In one embodiment, video display unit 1310, alphanumeric input device 1312, and cursor control device 1314 may be combined into a single component or device (e.g., an LCD touch screen).

Data storage device 1318 may include a computer-readable storage medium 1328 on which may be stored one or more sets of instructions 1325 that may include instructions for a challenge configuration component, e.g., challenge generation 1366 for carrying out the operations described herein, in accordance with one or more aspects of the present disclosure. Instructions 1325 may also reside, completely or at least partially, within main memory 1304 and/or within processing device 1302 during execution thereof by computing device 1300, main memory 1304 and processing device 1302 also constituting computer-readable media. The instructions 1325 may further be transmitted or received over a network 1320 via network interface device 1308.

While computer-readable storage medium 1328 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, and magnetic media.

Figure 14:
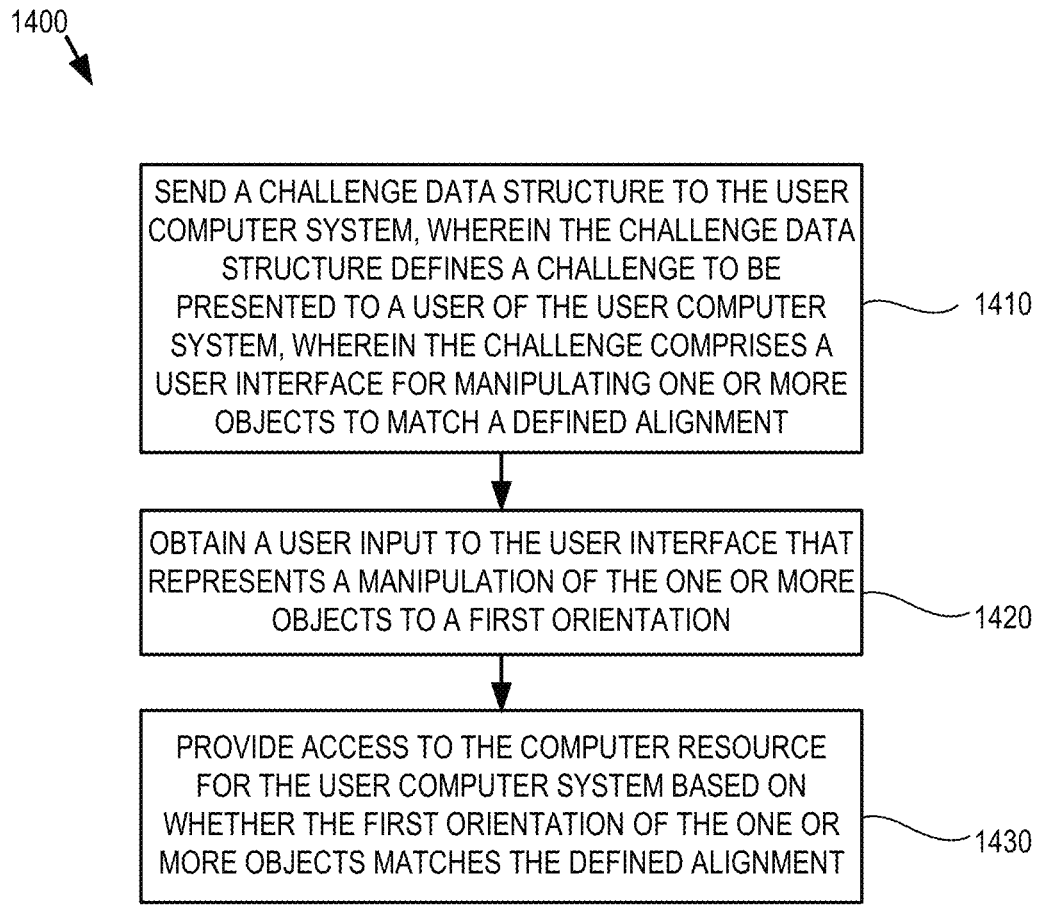
FIG. 14 is a flow diagram of a method for securing a computer resource against unauthorized access by a user computer system attempting to access the computer resource, in accordance with some embodiments of the present disclosure.

FIG. 14 is a flow diagram of a method 1400 for securing a computer resource against unauthorized access by a user computer system attempting to access the computer resource, in accordance with some embodiments of the present disclosure. Method 1400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1400 may be performed by a computing device (e.g., authentication challenge system 206, 306, 406, 506, 606 illustrated in FIGS. 2, 3, 4, 5, 6).

With reference to FIG. 14, method 1400 illustrates example functions used by various embodiments. Although specific function blocks ("blocks") are disclosed in method 1400, such blocks are examples. That is, embodiments are well suited to performing various other blocks or variations of the blocks recited in method 1400. It is appreciated that the blocks in method 1400 may be performed in an order different than presented, and that not all of the blocks in method 1400 may be performed.

Referring simultaneously to the prior figures as well, the method 1400 begins at block 1410, in which a challenge data structure is sent to a user computer system. The challenge data structure defines a challenge to be presented to a user of the user computer system. The challenge comprises a user interface for manipulating one or more objects to match a defined alignment. In some embodiments, the one or more objects may correspond to the object 830 as described herein with respect to FIGS. 8A to 8E. In some embodiments, the one or more objects may correspond to the tiles 1026 as described herein with respect to FIGS. 10A to 10C. In some embodiments, the defined alignment may be a directional alignment, such as that indicated by alignment indicator 840, as described herein with respect to FIGS. 8A to 8E. In some embodiments, the defined alignment may be an alignment of an image, such as the alignment of the disjointed image 1022, as described herein with respect to FIGS. 10A to 10C.

In some embodiments, the challenge to be presented to the user of the user computer system comprises an alignment indicator, and the alignment indicator indicates the defined alignment. The alignment indicator may be similar to alignment indicator 840, as described herein with respect to FIGS. 8A to 8E. In some embodiments, the alignment indicator includes a front portion and a rear portion, such as front portion 844 and rear portion 846 described herein with respect to FIGS. 8A to 8E. The one or more objects may include a front portion and a rear portion, such as front portion 834 and rear portion 836 described herein with respect to FIGS. 8A to 8E. The first orientation of the one or more objects matches the defined alignment when the front portion of the one or more objects is oriented in a same direction as the front portion of the alignment indicator.

At block 1420, a user input to the user interface is obtained that represents a manipulation of the one or more objects to a first orientation. In some embodiments, the first orientation may correspond to an orientation in which the object 830 is rotated and/or an orientation in which an object 830 is arranged in a selected image of a plurality of images, as described herein with respect to FIGS. 8A to 8E. In some embodiments, the first orientation may correspond to an orientation of an object, such as a tile 1026 within a disjointed image 1022, as described herein with respect to FIGS. 10A to 10C. In some embodiments, the manipulation of the one or more objects comprises a rotation of the one or more objects along one or more axes of rotation. For example, the rotations may be similar to rotations performed around axes of rotation 890, as described herein with respect to FIGS. 8A to 8D. In some embodiments, the rotations may be similar to rotations of the tiles 1026 around an axis of rotation that is, for example, perpendicular to the user interface 1000, as described herein with respect to FIGS. 8A to 8D.

In some embodiments, the challenge to be presented to the user of the user computer system comprises a disjointed image, and the one or more objects comprise one or more movable tiles of the disjointed image. The user input to the user interface may include an adjustment of the one or more movable tiles of the disjointed image to bring the disjointed image into alignment. The disjointed image and the one or more movable tiles may be similar to the disjointed image 1022 and the tiles 1026, described herein with respect to FIGS. 10A to 10C. In some embodiments, the adjustment of the one or more movable tiles of the disjointed image to bring the disjointed image into alignment comprises a movement of the one or more movable tiles until a first portion of the disjointed image displayed on the one or more movable tiles aligns with a second portion of the disjointed image adjacent the one or more movable tiles. In some embodiments, the adjustment of the one or more movable tiles of the disjointed image to bring the disjointed image into alignment comprises a movement of the one or more movable tiles until a first portion of the disjointed image displayed on the one or more movable tiles aligns with a second portion of the disjointed image adjacent the one or more movable tiles. The alignment of the disjointed image may be similar to the alignment of the disjointed image 1022 illustrated in the interface 1102 of FIG. 11. In some embodiments, the adjustment of the one or more movable tiles of the disjointed image to bring the disjointed image into alignment comprises a sliding or a rotating of the one or more movable tiles.

At block 1430, access is provided to a computer resource for the user computer system based on whether the first orientation of the one or more objects matches the defined alignment. In some embodiments, the access to the computer resource may comprise data from a value server 204, 304, as described herein with respect to FIGS. 2 and 3.

Unless specifically stated otherwise, terms such as "sending," "obtaining," "providing," "adjusting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the term "and/or" includes any and all combinations of one or more of the associated listed items. As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of securing a computer resource against unauthorized access by a user computer system attempting to access the computer resource, the method comprising:
   generating a challenge data structure defining a challenge comprising a user interface to manipulate one or more objects to match a defined alignment, wherein generating the challenge comprises adjusting, based on a risk of the user computer system, a number of possible combinations of the one or more objects by increasing a rotation axis of the one or more objects and reducing an angular increment associated with a control for the one or more objects;
   sending, by a processing device, the challenge data structure to the user computer system to cause the challenge to be presented to the user of the user computer system;
   obtaining a user input to the user interface that represents a manipulation of the one or more objects to a first orientation; and
   providing access to the computer resource for the user computer system based on whether the first orientation of the one or more objects matches the defined alignment.

2. The method of claim 1, wherein the manipulation of the one or more objects comprises a rotation of the one or more objects along one or more axis of rotation.

3. The method of claim 1, wherein the challenge to be presented to the user of the user computer system comprises an alignment indicator, and wherein the alignment indicator indicates the defined alignment.

4. The method of claim 3, wherein the alignment indicator comprises a front portion and a rear portion,
   wherein the one or more objects comprises a front portion and a rear portion, and
   wherein the first orientation of the one or more objects matches the defined alignment when the front portion of the one or more objects is oriented in a same direction as the front portion of the alignment indicator.

5. The method of claim 1, wherein the challenge to be presented to the user of the user computer system comprises a disjointed image,
   wherein the one or more objects comprise one or more movable tiles of the disjointed image, and
   wherein the user input to the user interface comprises an adjustment of the one or more movable tiles of the disjointed image to bring the disjointed image into alignment.

6. The method of claim 5, wherein the adjustment of the one or more movable tiles of the disjointed image to bring the disjointed image into alignment comprises a movement of the one or more movable tiles until a first portion of the disjointed image displayed on the one or more movable tiles aligns with a second portion of the disjointed image adjacent to the one or more movable tiles.

7. The method of claim 5, wherein the adjustment of the one or more movable tiles of the disjointed image to bring the disjointed image into alignment comprises a sliding or a rotating of the one or more movable tiles.

8. A computer system comprising:
a memory; and
a processing device, operatively coupled to the memory, to:
　generate a challenge data structure defining a challenge comprising a user interface to manipulate one or more objects to match a defined alignment, wherein to generate the challenge, the processing device to adjust, based on a risk of the user computer system, a number of possible combinations of the one or more objects by increasing a rotation axis of the one or more objects and reducing an angular increment associated with a control for the one or more objects;
　send the challenge data structure to a user computer system to cause the challenge to be presented to the user of the user computer system;
　obtain a user input to the user interface that represents a manipulation of the one or more objects to a first orientation; and
　provide access to a computer resource for the user computer system based on whether the first orientation of the one or more objects matches the defined alignment.

9. The computer system of claim 8, wherein the manipulation of the one or more objects comprises a rotation of the one or more objects along one or more axis of rotation.

10. The computer system of claim 8, wherein the challenge to be presented to the user of the user computer system comprises an alignment indicator, and wherein the alignment indicator indicates the defined alignment.

11. The computer system of claim 10, wherein the alignment indicator comprises a front portion and a rear portion,
　wherein the one or more objects comprises a front portion and a rear portion, and
　wherein the first orientation of the one or more objects matches the defined alignment when the front portion of the one or more objects is oriented in a same direction as the front portion of the alignment indicator.

12. The computer system of claim 8, wherein the challenge to be presented to the user of the user computer system comprises a disjointed image,
　wherein the one or more objects comprise one or more movable tiles of the disjointed image, and
　wherein the user input to the user interface comprises an adjustment of the one or more movable tiles of the disjointed image to bring the disjointed image into alignment.

13. The computer system of claim 12, wherein the adjustment of the one or more movable tiles of the disjointed image to bring the disjointed image into alignment comprises a movement of the one or more movable tiles until a first portion of the disjointed image displayed on the one or more movable tiles aligns with a second portion of the disjointed image adjacent to the one or more movable tiles.

14. The computer system of claim 12, wherein the adjustment of the one or more movable tiles of the disjointed image to bring the disjointed image into alignment comprises a sliding or a rotating of the one or more movable tiles.

15. A non-transitory computer-readable storage medium including instructions that, when executed by a processing device, cause the processing device to:
　generate a challenge data structure defining a challenge comprising a user interface to manipulate one or more objects to match a defined alignment, wherein to generate the challenge, the processing device is to adjust, based on a risk of the user computer system, a number of possible combinations of the one or more objects by increasing a rotation axis of the one or more objects and reducing an angular increment associated with a control for the one or more objects;
　send, by the processing device, the challenge data structure to a user computer system to cause challenge to be presented to the user of the user computer system;
　obtain a user input to the user interface that represents a manipulation of the one or more objects to a first orientation; and
　provide access to a computer resource for the user computer system based on whether the first orientation of the one or more objects matches the defined alignment.

16. The non-transitory computer-readable storage medium of claim 15, wherein the manipulation of the one or more objects comprises a rotation of the one or more objects along one or more axis of rotation.

17. The non-transitory computer-readable storage medium of claim 15, wherein the challenge to be presented to the user of the user computer system comprises an alignment indicator, and wherein the alignment indicator indicates the defined alignment.

18. The non-transitory computer-readable storage medium of claim 17, wherein the alignment indicator comprises a front portion and a rear portion,
　wherein the one or more objects comprises a front portion and a rear portion, and
　wherein the first orientation of the one or more objects matches the defined alignment when the front portion of the one or more objects is oriented in a same direction as the front portion of the alignment indicator.

19. The non-transitory computer-readable storage medium of claim 15, wherein the challenge to be presented to the user of the user computer system comprises a disjointed image,
　wherein the one or more objects comprise one or more movable tiles of the disjointed image, and
　wherein the user input to the user interface comprises an adjustment of the one or more movable tiles of the disjointed image to bring the disjointed image into alignment.

20. The non-transitory computer-readable storage medium of claim 19, wherein the adjustment of the one or more movable tiles of the disjointed image to bring the disjointed image into alignment comprises a movement of the one or more movable tiles until a first portion of the disjointed image displayed on the one or more movable tiles aligns with a second portion of the disjointed image adjacent to the one or more movable tiles.

\* \* \* \* \*